United States Patent [19]

Yamada et al.

[11] Patent Number: 5,912,780
[45] Date of Patent: Jun. 15, 1999

[54] MAGNETIC RECORDING AND REPRODUCING APPARATUS

[75] Inventors: Yasuaki Yamada; Takeo Ohishi, both of Yokohama, Japan

[73] Assignee: Victor Company of Japan, Ltd., Yokohama, Japan

[21] Appl. No.: 08/787,771

[22] Filed: Jan. 28, 1997

[51] Int. Cl.$^6$ ................................................. G11B 15/14
[52] U.S. Cl. ........................... 360/64; 360/70; 360/75; 386/6; 386/72; 386/74; 386/78; 386/79; 386/80; 386/81
[58] Field of Search ............................ 360/55, 64, 70, 360/75, 8; 386/68, 72, 74, 78–81, 6

[56] References Cited

U.S. PATENT DOCUMENTS 4,703,370 10/1987 Inoue et al. .............................. 386/78
5,184,254 2/1993 Kaneko et al. ........................... 386/74

*Primary Examiner*—Aristotelis M. Psitos
*Assistant Examiner*—Dan Israel Davidson
*Attorney, Agent, or Firm*—Michael N. Meller

[57] ABSTRACT

A magnetic recording and reproducing apparatus has a rotary magnetic head mechanism having at least a first rotary magnetic head with a magnetic gap set to a azimuth angle less than 90 degrees in a clockwise direction with respect to a width direction of recorded traces and a second rotary magnetic head with a magnetic gap set to a azimuth angle less than 90 degrees in a counterclockwise direction with respect to the width direction. The traces are formed on a magnetic tape moving in a forward direction at a speed in accordance with a rotational locus of the heads moving and obliquely crossing a travel direction of the tape. The first output signals obtained by the first head are selected in the case where a rotational locus surface of the heads changes in a reproduction operation within an angular range less than 180 degrees in a clockwise direction with respect to the traces formed on the tape. On the other hand, the second output signals obtained by the second head are selected in the case where the rotational locus surface of the heads changes in the reproduction operation within an angular range less than 180 degrees in a counterclockwise direction with respect to the direction of the traces formed on the tape. Reproduction is executed in response to the selected first or second output signals while the tape is being moved in the forward direction or a reverse direction at a speed higher than that while recording.

5 Claims, 8 Drawing Sheets

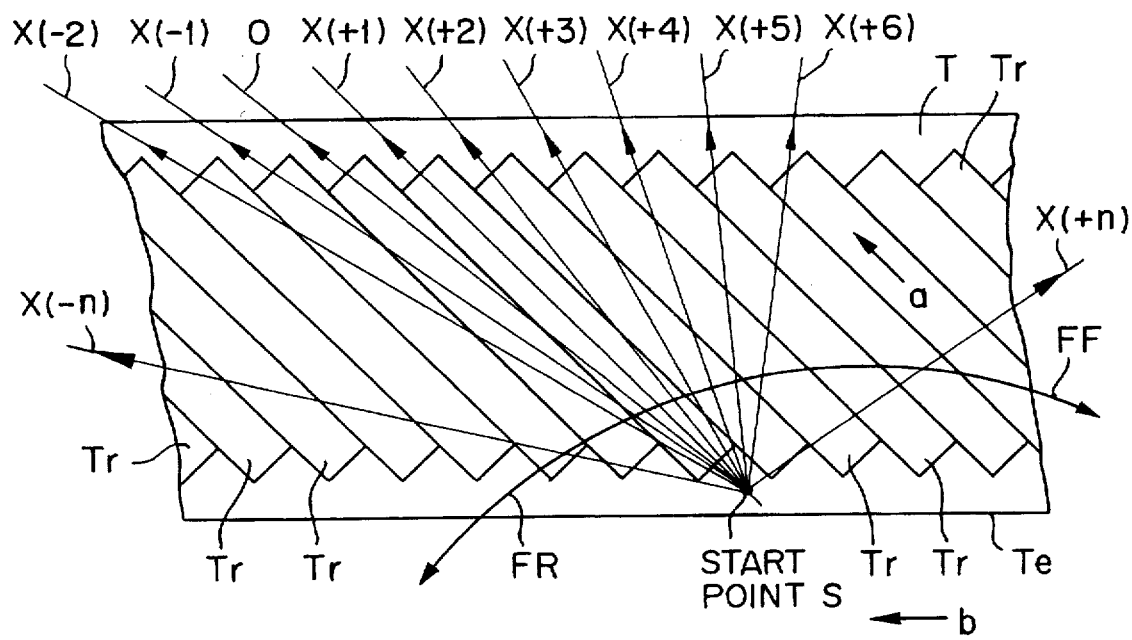
F I G. 1
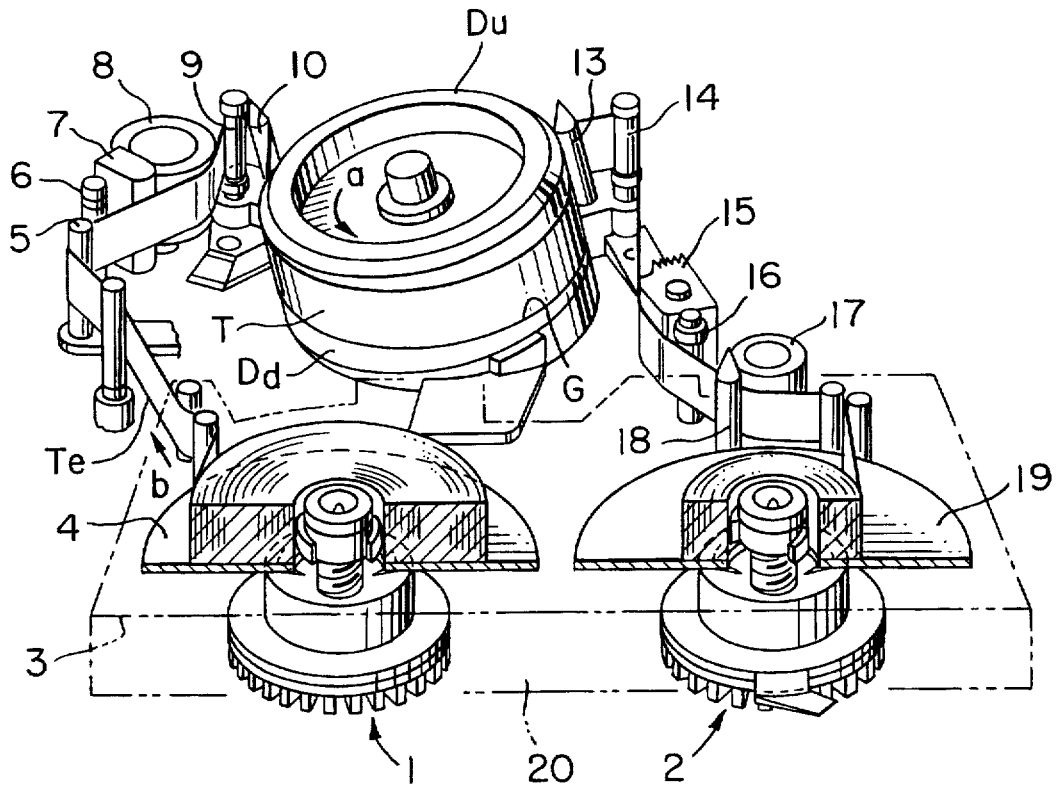
F I G. 2

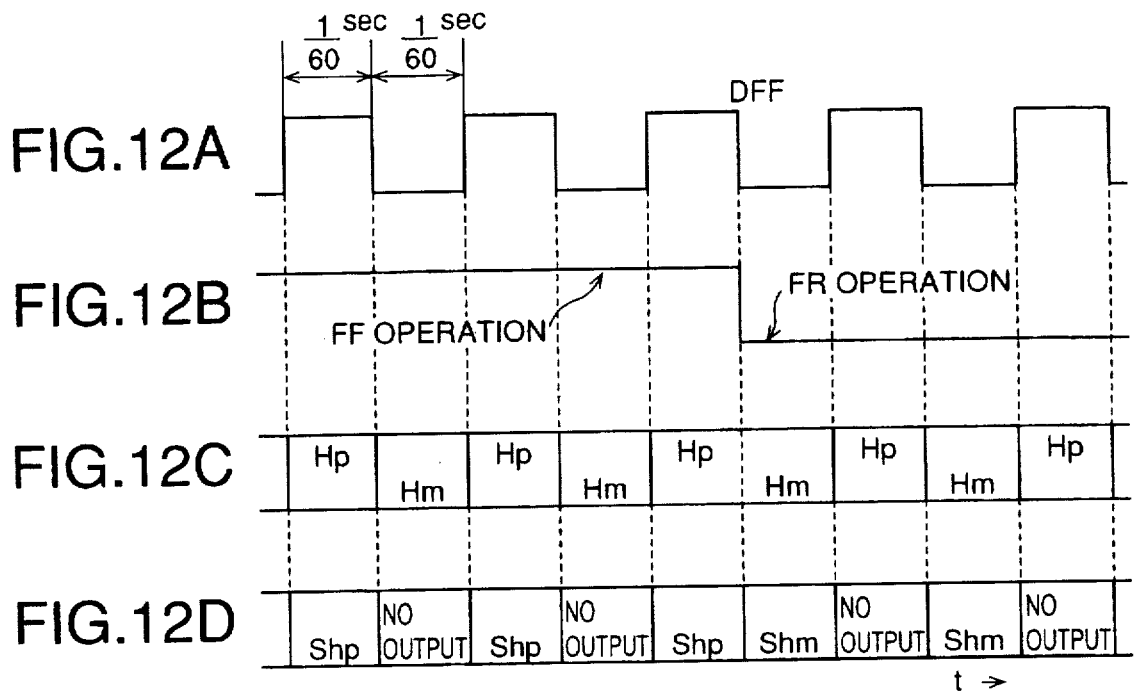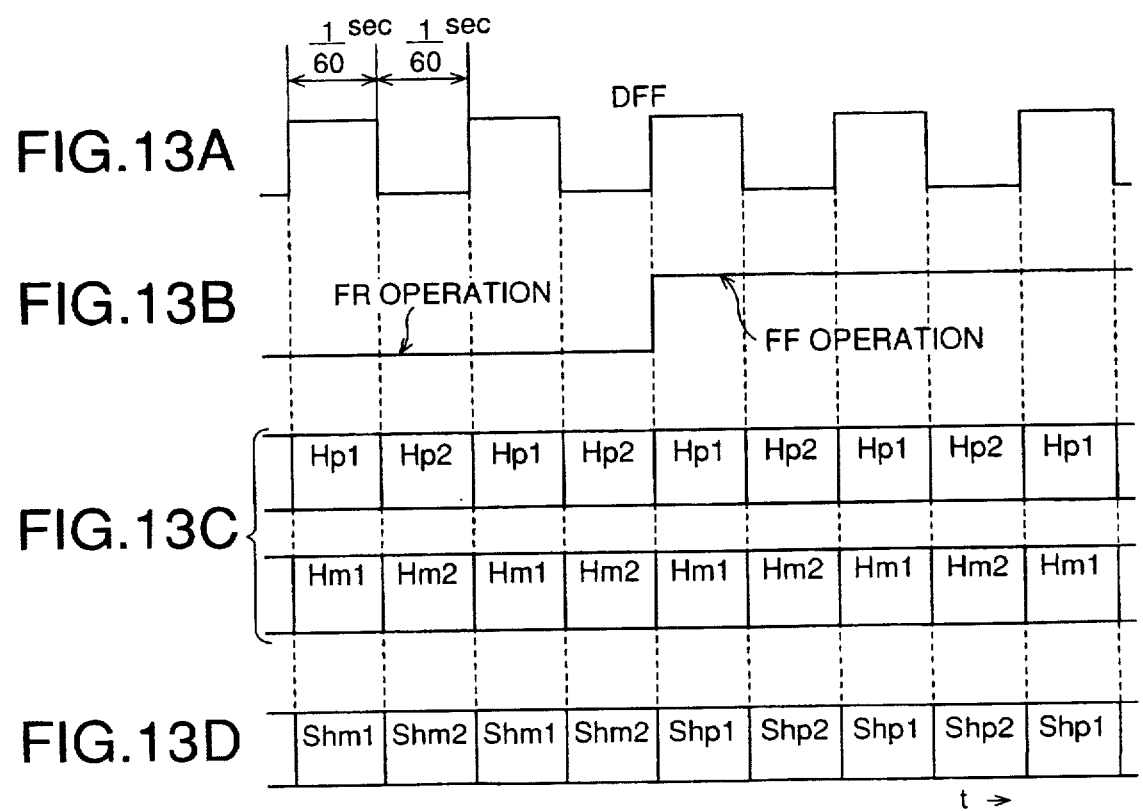

MAGNETIC RECORDING AND REPRODUCING APPARATUS

BACKGROUND OF THE INVENTION

The present invention relates to a helical scanning type magnetic recording and reproducing apparatus for executing recording and reproducing operation by use of a magnetic tape wound around a part of a circumferential surface of a drum of an upper drum and a lower drum and a plurality of rotary magnetic heads. More specifically, this invention relates to a magnetic recording and reproducing apparatus for reproducing data from the magnetic tape under excellent conditions when the recorded magnetic tape is being moved at a travel speed different from that at which data are recorded.

The helical scanning type magnetic recording and reproducing apparatus for recording and reproducing data to and from a magnetic tape wound around a part of a circumferential surface of a drum of an upper drum and a lower drum by use of a plurality of rotary magnetic heads has been so far well known and widely used as a VTR. In addition, this recording and reproducing apparatus has now been unitized as an apparatus of a large memory capacity which can record and reproduce a great amount of digital data.

In the helical scanning type magnetic recording and reproducing apparatus as described above, as a means for achieving high density recording, a pair of rotary magnetic heads having two magnetic gaps of two opposite azimuth angles are used. In more detail, one of the rotary magnetic heads has a magnetic gap whose azimuth angle is set at a predetermined angle less than 90 degrees in the clockwise direction with respect to the width direction of the recording traces (tracks). The other has a magnetic gap whose azimuth angle is set at a predetermined angle less than 90 degrees in the counterclockwise direction with respect to the width direction of the recording traces (tracks).

The two rotary magnetic heads are arranged at 180 degree symmetrical positions on the circumference of an upper drum and rotated at a predetermined number of rotations. Here, a magnetic tape is moved at a predetermined travel speed under such conditions that a reference edge position of the magnetic tape wound spirally around at least a part of the circumferential surfaces of the upper and lower drums is restricted by a guide portion (lead) formed at a lower drum. Data are recorded or reproduced to and from the magnetic tape when it is helically scanned by a pair of the rotary magnetic heads alternately in sequence. That is, data can be recorded on traces formed on the magnetic tape in sequence and in close vicinity to each other or the recorded data can be reproduced from the recorded traces, in correspondence to each 180-degree rotation of a pair of the two rotary magnetic heads.

Further, in the helical scanning type magnetic recording and reproducing apparatus, in order to record and reproduce wide band signals, a plurality of magnetic rotary heads having magnetic gaps of different azimuth angles are juxtaposed at two 180-degree symmetrical positions of the upper drum. A plurality of parallel arranged recorded traces can be formed at the same time by use of a plurality of the rotary magnetic heads which constitute a rotary magnetic head assembly.

Further, in the helical scanning type magnetic recording and reproducing apparatus, in the case where the wide band signal to be recorded and reproduced is an analog signal, the analog signal is extended on the time axis as a plurality of simultaneous signals. The extended simultaneous signals are recorded or reproduced in parallel to each other by the rotary magnetic heads. Further, in the case where recorded and reproduced signal is a wide-band digital signal of high bit rate, the digital signal is transformed into a plurality of digital signals of low bit rate and then the transformed digital signals are recorded or reproduced in parallel to each other by the rotary magnetic heads.

Now, in the above-mentioned helical scanning type magnetic recording and reproducing apparatus, the pattern of the recorded traces formed on the magnetic tape in accordance with the rotational locus of the rotary magnetic heads can be decided on the basis of various conditions such as the drum diameter, the number of rotations of the rotary magnetic heads, the rotational direction of the rotary magnetic heads, the travel speed of the magnetic tape, the travel direction of the magnetic tape, the track angle, the head track width, the recorded region width on the magnetic tape, etc. Therefore, when the conditions of the travel direction and the travel speed, for instance, of the magnetic tape change according to change of the operation mode of the magnetic recording and reproducing apparatus, the rotational locus pattern described on the magnetic tape by the rotary magnetic heads changes as shown in FIG. 1.

For instance, in the case where the magnetic recording and reproducing apparatus of VHS system (Trademark) is in SP mode, the rotary magnetic heads mounted on a rotary drum having a diameter of 62 mm are rotating at 1800 r.p.m. and the magnetic tape wound around a part of the outer circumferences of the upper rotary drum and a lower stationary drum is moved in the forward direction at a travel speed of 33.35 mm/sec in both the recording and reproducing operation. Under these conditions, the rotational locus of the rotary magnetic heads formed on the magnetic tape by the rotary magnetic heads is angled at 5° 58' 9.9" with respect to the reference edge of the magnetic tape.

Further, in the magnetic recording and reproducing apparatus of VHS system, suppose that the rotary magnetic heads mounted on a rotary drum having a diameter of 62 mm are rotating at 1800 r.p.m. and the magnetic tape wound around a part of the outer circumferences of the drums is moved in the forward direction at a travel speed of 66.7 mm/sec in the reproducing operation (twice speed reproduction in the forward direction.) Under these conditions, the rotational locus of the rotary magnetic heads formed on the magnetic tape by the rotary magnetic heads is angled at 6° 2' 19.2" with respect to the reference edge of the magnetic tape.

Further, in the magnetic recording and reproducing apparatus of VHS system, suppose that the rotary magnetic heads mounted on a upper rotary drum having a diameter of 62 mm are rotating at 1800 r.p.m. and the magnetic tape wound around a part of the outer circumferences of the upper rotary drum and a lower stationary drum is moved in the opposite direction at a travel speed of 66.7 mm/sec in the reproducing operation (twice speed reproduction in the reverse direction.) Under these conditions, the rotational locus of the rotary magnetic heads formed on the magnetic tape by the rotary magnetic heads is angled at 5° 54' 6.2" with respect to the reference edge of the magnetic tape.

Further, in the magnetic recording and reproducing apparatus of VHS system, suppose that the rotary magnetic heads mounted on a upper rotary drum having a diameter of 62 mm are rotating at 1800 r.p.m. and the magnetic tape wound around a part of the outer circumferences of the upper rotary drum and a lower stationary drum is kept stopped. In this case, the rotational locus of the rotary magnetic heads formed on the magnetic tape by the rotary magnetic heads is angled at 5° 56' 7.4" with respect to the reference edge of the magnetic tape.

Further, on condition that the inclination angle of a rotary axle of the rotary magnetic head does not change, the position of the rotational locus of the rotary magnetic heads described in the space is kept constant. That is, on condition that the magnetic tape is kept stopped, the rotational locus of the rotary magnetic head formed on the magnetic tape by the rotary magnetic head (i.e., the rotational locus of the rotary magnetic head in still reproduction) can be represented by a straight line connected between a start point and a zero point in FIG. 1.

In use of the magnetic recording and reproducing apparatus, in addition to the normal reproduction such that recorded data are reproduced at a tape travel speed the same as that in the recording operation, there are widely used a trick play such that recorded data are reproduced at a tape travel speed and in a tape travel direction different from those in the recording operation (including stop). In these reproduction modes, as apparent from the above-mentioned examples shown in FIG. 1, when the magnetic tape travel speed and direction change, the rotation locus of the rotary magnetic heads differs according to the different tape travel speed and direction, as shown in FIG. 1.

In FIG. 1, T denotes a magnetic tape; "a" denotes a travel direction of the rotary magnetic head; "b" denotes a travel direction of the magnetic tape T; and Tr, Tr, . . . , denote sequential recorded traces (tracks) formed on the magnetic tape T moving at a predetermined travel speed in the forward direction in accordance with the rotational locus of the rotary magnetic heads obliquely crossing the travel direction of the magnetic tape. Here, the recorded traces are in parallel to the straight line connected between the start point and a point x(+1) in FIG. 1.

The straight line connected between the start point and the 0 point shown in FIG. 1 indicates a rotational locus formed on the magnetic tape T by the rotary magnetic head rotating at a predetermined number of rotations in the "a" direction on condition that the magnetic tape T is kept stopped.

Further, the straight line connected between the start point and the point x(+1) shown in FIG. 1 indicates the rotational locus formed on the moving magnetic tape T by the rotating magnetic head, obtained when the travel direction "b" and speed of the magnetic tape are the same as those in the recording operation (for forming the recorded traces on the magnetic tape T) and further when the rotational direction and speed of the rotary magnetic head are also the same as those in the recording operation.

By the way, in the expression of x(+1), x(+2), x(+3), . . . , x(+n), x(−1), x(−2), x(−3), . . . , x(−n) shown in FIG. 1, "+" indicates that the magnetic tape is moved in the travel direction the same as that in recording operation; "−" indicates that the magnetic tape is moved in the travel direction opposite to that in recording operation; and 1, 2, 3, . . . , n indicate a multiple number of the magnetic tape travel speed when the magnetic tape travel speed in the recording operation is determined as one.

Further, in FIG. 1, a plurality of arrow straight lines extending from the start point in the radial directions indicate the rotational locus directions of the rotary magnetic heads formed on the moving magnetic tape, when the magnetic tape travel direction and speed are both changed to various values, on condition that the rotational direction and speed of the rotary magnetic heads are kept at the same values as in the recording operation.

Further, in the case of the FF reproduction such that the travel direction of the magnetic tape T is the same as that in the recording operation, the rotation locus direction formed on the moving magnetic head by the magnetic heads changes with increasing multiple number of the magnetic tape travel speed from a start point S in the clockwise direction FF in FIG. 2. Further, in the case of the FR reproduction such that the travel direction of the magnetic tape T is opposite to that in the recording operation, the rotation locus direction formed on the moving magnetic head by the magnetic heads changes with increasing multiple number of the magnetic tape travel speed from the start point S in the counterclockwise direction FR in FIG. 1.

As described above, when the magnetic tape travel speed in the reproduction operation is different from that in the recording operation, the rotational locus of the rotary magnetic heads crosses the recorded traces formed on the recorded magnetic tape in the reproduction operation. Therefore, when the reproduction operation is executed under such condition that the rotational locus of the rotary magnetic heads crosses the recorded traces formed on the recorded magnetic tape, it is apparent that the signals recorded on the recorded traces cannot be reproduced accurately by the rotary magnetic heads.

This problem can be solved by matching the rotational locus of the rotary magnetic heads with the recorded traces formed on the magnetic tape. Therefore, in the case of the VTR for recording and reproducing analog signals, various solving methods have been so far proposed as follows: (1) the rotary magnetic heads are mounted on an electricity-machine transducing element used as an actuator for an opened or closed loop control circuit, and the rotary magnetic heads are moved so as to follow the recorded traces on the magnetic tape; (2) the upper drum provided with the rotary magnetic heads is inclined together with the lower drum, to allow the rotary head to follow the recorded traces on the magnetic tape; (3) the height of the guide formed extending from the magnetic tape incoming side to the magnetic tape outgoing sides of the drum to restrict the width direction of the magnetic tape is changed, to allow the rotary heads to follow the recorded traces on the magnetic tape; and (4) the central axle of the drum is inclined and further the guide portion of the drum at the reference edge of the magnetic tape are both changed, to allow the rotary heads to follow the recorded traces on the magnetic tape.

In addition, in the VTR for recording and reproducing analog signals, the following solving method has been so far proposed: (5) in order to obtain relatively excellent reproduced signals by use of rotary magnetic heads having magnetic gaps of opposite azimuth angles, even when the magnetic tape is moved at a travel speed higher than that in the recording operation; that is, even when the rotational locus of the rotary magnetic heads used for the reproduction cross the recorded traces formed on the recorded magnetic tape, a double-azimuth head such that two magnetic heads having two magnetic gaps of two opposite azimuth angles are juxtaposed at two 180-degree symmetrical positions of the upper drum; the envelops of signals reproduced by the rotary magnetic heads are detected in reproduction operation, to select the reproduced signals generated by the rotary magnetic head for generating the reproduced signals of large signal level in sequence.

In the above-mentioned solving methods from (1) to (4), when the multiple number (or coefficient) of the tape travel speed is relatively small, these methods can be adopted relatively easily. However, when the travel speed of the magnetic tape in the reproduction operation is extremely higher than that in the recording operation, it is difficult to apply these methods.

Further, when the above-mentioned method (5) is applied to the VTR for recording and reproducing analog signals and further the multiple number of the tape travel speed is relatively small, relatively excellent results can be obtained. However, when the travel speed of the magnetic tape in the reproduction operation is selected to an extremely higher value than that in the recording operation, it is difficult to always obtain the excellent reproduction operation.

On the other hand, there is a case where signals are recorded and reproduced in the form of a bit stream of digital data and further that the reproduction operation of the apparatus is controlled on the basis of reproduced track data or control data included in the reproduced digital data bit stream. When the data are required to be reproduced at the magnetic tape travel speed extremely higher than that in the recording operation; that is, when the rotational locus of the rotary magnetic heads used in the reproduction operation cross the recorded traces formed on the recorded magnetic tape, it is impossible to accurately reproduce the track data and the control data included in the reproduced digital data bit stream, with the result that it is impossible to execute an accurate reproduction operation. In summary, since the above-mentioned solving methods (1) to (5) are not suitable for the ultra-high speed reproduction operation of digital signals, there exists a need of solving the above-mentioned problems.

SUMMARY OF THE INVENTION

With these problems in mind, therefore, it is the object of the present invention to provide a magnetic recording and reproducing apparatus, which can reproduce recorded data accurately by the rotary magnetic heads, even when the magnetic tape travel speed in the reproduction operation is different from that in the recording operation; that is, even if the rotational locus of the rotary magnetic heads crosses the recorded traces formed on the recorded magnetic tape in the reproduction operation.

To achieve the above-mentioned object, the present invention provides a magnetic recording and reproducing apparatus comprising: a rotary magnetic head mechanism having at least a first rotary magnetic head with a magnetic gap set to a predetermined azimuth angle less than 90 degrees in a clockwise direction with respect to a width direction of recorded traces and a second rotary magnetic head with a magnetic gap set to a predetermined azimuth angle less than 90 degrees in a counterclockwise direction with respect to the width direction of the recorded traces; recording means for forming the recorded traces on a magnetic tape moving in a forward direction at a predetermined travel speed in accordance with a rotational locus of the rotary magnetic heads moving and obliquely crossing a travel direction of the magnetic tape; selecting means for selecting first output signals obtained by the first rotary magnetic head in the case where a rotational locus surface of the rotary magnetic heads changes in a reproduction operation within an angular range less than 180 degrees in a clockwise direction with respect to the recorded traces formed on the recorded magnetic tape, on the other hand, the second means selecting second output signals obtained by the second rotary magnetic head in the case where the rotational locus surface of the rotary magnetic heads changes in the reproduction operation within an angular range less than 180 degrees in a counterclockwise direction with respect to the direction of the recorded traces formed on the recorded magnetic tape; and reproducing means, responsive to the selected first or second output signals, for executing the reproduction operation while the recorded magnetic tape is being moved in the forward direction or a reverse direction at a travel speed higher than a travel speed in a recording operation by the recording means.

Further, the present invention provides a magnetic recording and reproducing apparatus comprising a rotary magnetic head mechanism having at least a first rotary magnetic head with a magnetic gap set to a predetermined azimuth angle less than 90 degrees in a clockwise direction with respect to a width direction of recorded traces and a second rotary magnetic head with a magnetic gap set to a predetermined azimuth angle less than 90 degrees in a counterclockwise direction with respect to the width direction of the recorded traces; recording means for recording data including first and second control data, the recorded traces being formed on a magnetic tape moving in a forward direction at a predetermined travel speed in accordance with a rotational locus of the rotary magnetic heads moving and obliquely crossing a travel direction of the magnetic tape; selecting means for selecting the first control data included in first output signals obtained by the first rotary magnetic head in the case where a rotational locus surface of the rotary magnetic heads changes in a reproduction operation within an angular range less than 180 degrees in a clockwise direction with respect to the recorded traces formed on the recorded magnetic tape, on the other hand, the selecting means selecting the second control data included in second output signals obtained by the second rotary magnetic head in the case where the rotary locus surface of the rotary magnetic heads changes in the reproduction operation within an angular range less than 180 degrees in a counterclockwise direction with respect to the direction of the recorded traces formed on the recorded magnetic tape; and reproducing means, responsive to the selected first or second control data, for executing the reproduction operation while the recorded magnetic tape is being moved in the forward direction or a reverse direction at a travel speed higher than a travel speed in a recording operation by the recording means.

The selecting means may include means for generating a drum rotation reference signal on the basis of the data to be recorded; means, responsive to the drum rotation reference signal, for controlling the rotary magnetic head mechanism to rotate at a predetermined number of rotation; means, responsive to the rotation of the controlled rotary magnetic head mechanism, for detecting the first and second output signals; and means, responsive to the drum rotation reference signal, for selecting the first control data when the magnetic tape is moved in the forward direction, on the other hand, for selecting the second control data when the magnetic tape is moved in the reverse direction.

BRIEF DESCRIPTION OF THE DRAWINGS

FIG. 1 is an illustration for assistance in explaining the relationship between the recorded traces of the magnetic tape and the rotational locus of the rotary magnetic head;

FIG. 2 is a perspective view showing a tape travel system used for the magnetic recording and reproducing apparatus according to the present invention;

FIGS. 12A to 12D are timing charts for assistance in explaining an example of the control signal selection; and FIGS. 13A to 13D are timing charts for assistance in explaining another example of the control signal selection.

DETAILED DESCRIPTION OF THE PREFERRED EMBODIMENTS

Figure 3:
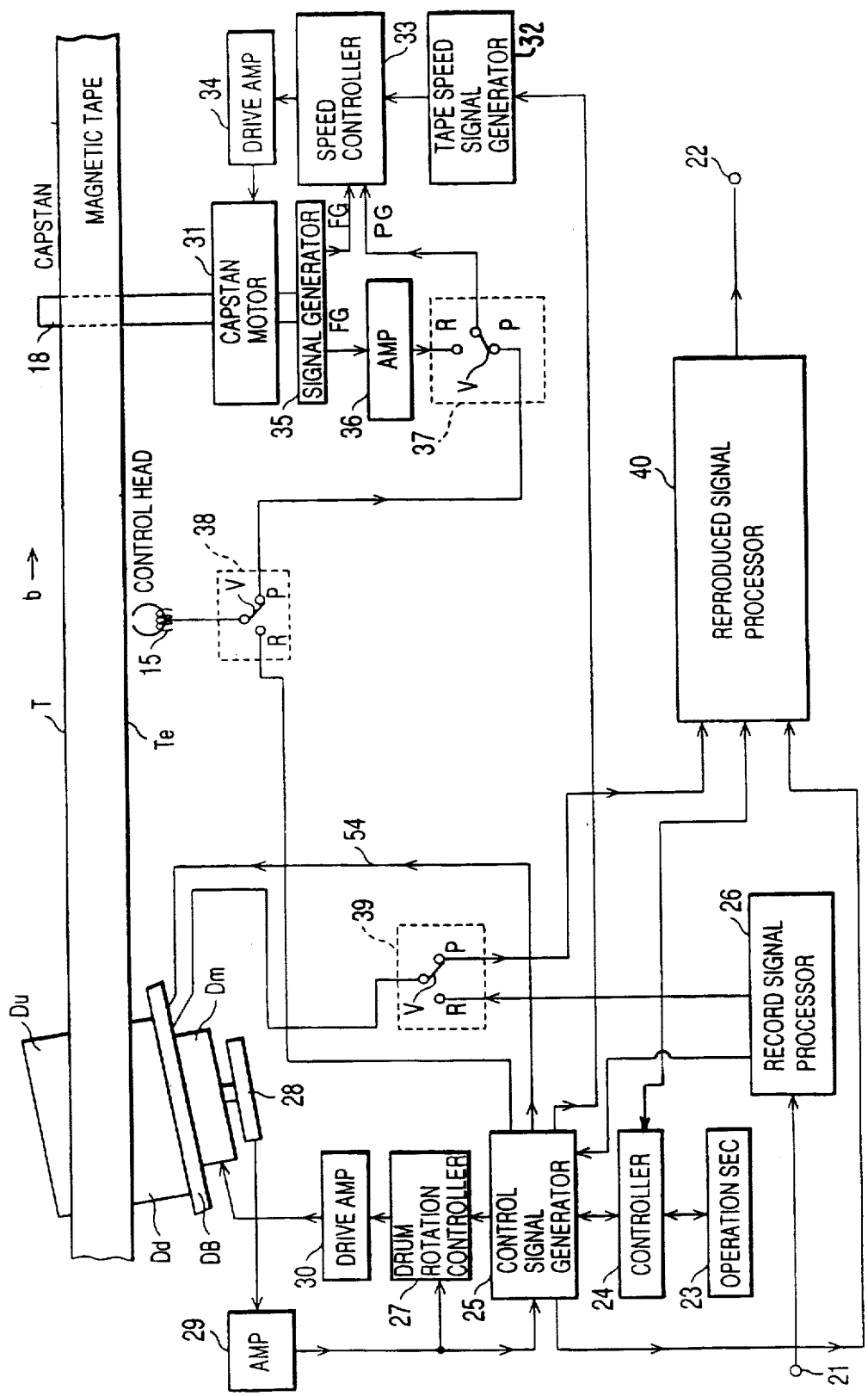
FIG. 3 is a block diagram showing the magnetic recording and reproducing apparatus according to the present invention.

The embodiment of the magnetic recording and reproducing apparatus according to the present invention will be described hereinbelow with reference to the attached drawings.

In FIG. 2, the magnetic recording and reproducing apparatus has a drum composed of a pair of upper drum Du and lower drum Dd. The lower drum Dd is formed with a guide portion G for restricting the position of a reference edge Te of a magnetic tape T.

A supply reel base 1 and a take-up reel base 2 are attached to a machine base 20. In a cassette case 3, a supply reel 4 and a take-up reel 19 to wind the magnetic tape T therearound. When the cassette case 3 is mounted on the VTR, the supply reel 4 is connected to the supply reel base 1 and further the take-up reel 19 is connected to the take-up reel base 2.

A loading mechanism of parallel loading type is provided with two loading poles (vertical rollers) 9 and 14. When the magnetic tape T is pulled out of the cassette case 3 by these two poles 9 and 14, the magnetic tape T can be stretched by this loading mechanism so as to be moved along a travel route. In more detail, the magnetic tape T is guided by a tension pole 5, a guide pole 6, an entire width erasing (full erase) head 7, an impedance roller 8, the loading pole (vertical roller) 9, and an inclined guide (slant pole) 10, etc., and then wound around a part of the circumferential surface of the upper drum Du rotating a predetermined number of rotations, and the lower drum Dd kept stopped in such a state that the reference edge Te of the magnetic tape is guided. Further, the magnetic tape T is guided by an inclined guide (slant pole) 13, the loading pole (vertical roller) 14, an audio control head 15, a guide pole 16, a capstan 18, a pinch roller 17, etc. and then wound around the take-up reel 19.

After the loading operation by the loading mechanism, the magnetic tape T is moved along the magnetic tape travel route (path) from the supply reel 4 to the take-up reel 19. That is, the magnetic tape T travels in the horizontal direction along the travel route of the tension pole 5, the guide pole 6, the entire-width erasing head 7, the impedance roller 8, and the loading pole (vertical roller) 9.

After that, the magnetic tape is wound so as to travel along the guide portion G formed in the lower drum Dd over an about 180-degree central angular range of the upper drum Du (rotating at a predetermined number of rotations) and the lower drum Dd, by changing the travel direction of the magnetic tape T by the inclined guide (slant pole) 10.

The travel direction of the magnetic tape T wound around the upper and lower drums Du and Dd over the 180-degree angular range is returned to the horizontal travel direction by the inclined guide (slant pole) 13, and then wound around the take-up reel 19 along the magnetic tape travel route of the loading pole (vertical guide roller) 14, the audio control head 15, the guide pole 16, the capstan 18, and the pinch roller 17. Further, in FIG. 2, the arrow direction "a" indicates the rotational direction of the upper drum Du, and the arrow direction "b" indicates the forward travel direction of the magnetic tape T. Here, the reverse travel direction of the magnetic tape T is of course the direction opposite to the direction "b".

Further, in FIG. 2, although a drum motor for driving the upper drum Du at a predetermined number of rotations is not shown for brevity, the drum motor can be mounted on a drum base DB (as shown in FIG. 3) so as to project downward, or else the rotor of the drum motor can be directly fixed to the upper drum Du.

In FIG. 3 which shows the structure of the magnetic recording and reproducing apparatus according to the present invention, video signals to be recorded are input through an input terminal 21, and reproduced video signals are output through an output terminal 22.

The upper drum Du and the lower drum Dd shown in FIG. 3 are the same as the upper and lower drums Du and Dd shown in FIG. 2. Further, in FIG. 3, the reference numerals 15 and 18 denote an audio control head and a capstan, respectively that correspond to the control head 15 and the capstan 18 shown in FIG. 2.

The magnetic recording and reproducing apparatus according to the present invention operates in a predetermined operation mode in response to the operation mode data input through an operation section 23 shown in FIG. 3. In more detail, when operation mode data is input from the operation section 23 to a controller 24, the controller 24 gives a command to a control signal generator 25, so that the respective sections of the apparatus can be operated in accordance with the operation mode input from the operation section 23. In other words, the control signal generator 25 supplies predetermined control signals to the respective sections of the apparatus.

When the apparatus shown in FIG. 3 operates so as to record analog video signals, composite signals to be recorded are applied to the input terminal 21, converted into recorded signals suitable for magnetic recording by a record signal processor 26. The recorded signals are amplified by a recorded signal amplifier provided in the record signal processor 26, and then output therefrom.

Further, when the apparatus shown in FIG. 3 operates so as to record the digital data bit stream, the digital data bit stream to be recorded is applied to the input terminal 21, converted into recorded signals suitable for magnetic recording by the record signal processor 26. The recorded signals are amplified by the record signal amplifier, and then output by the record signal processor 26.

When the apparatus is set to the recording operation mode for recording analog video signals, the vertical synchronizing signal is separated by a synchronizing signal separator provided in the signal processor 26. The separated synchronizing signal is supplied to the control signal generator 25 that generates a reference signal. The reference signal is supplied to a drum rotation controller 27.

Further, when the apparatus is set to the recording operation mode for recording the digital data bit stream, reference time value data are extracted from the digital data by the record signal processor 26 that generates time reference signals on the basis of the extracted time reference value data. The generated time reference signals are supplied to the control signal generator 25 to generate reference signals. The generated reference signals are supplied to the drum rotation controller 27. Further, a rotation pulse generated by a signal generator 28 mounted on the rotary axle of the drum motor Dm is amplified by an amplifier 29 and then supplied to the drum motor rotation controller 27. Further, the output signal of the amplifier 29 is also supplied to the control signal generator 25 to generate a DFF signal (drum rotation reference phase signal).

The drum motor rotation controller 27 thus generates a drum drive signal on the basis of the reference signal generated by the control signal generator 25 so that the number of rotations and the rotation phase of the drum motor Dm can be determined at the predetermined values. The drum motor drive signal is amplified by a drive amplifier 30, and then supplied to the drum motor Dm. Therefore, it is possible to control the rotary magnetic heads rotated together with the upper drum Du driven by the drum motor Dm, so as to be driven at predetermined number of rotations and phase.

Further, the magnetic tape T is driven by the capstan 18 and the pinch roller 17 (See FIG. 2) driven by a capstan motor 31 under control of the controller 24 so as to be moved continuously at a travel speed required for the recording operation mode.

In the recording operation, the travel conditions of the magnetic tape T are controlled by an automatic control system of a tape speed signal generator 32, a speed controller 33, a drive amplifier 34, the capstan motor 31, a signal generator 35 attached to the rotary axle of the capstan motor 31, an amplifier 36, a record-reproduce selection switch 37 having two fixed contacts R and P and a movable contact v. Here, after the synchronous signals supplied to the input terminal 21 have been separated by the record signal processor 26, predetermined synchronous signals are generated by the control signal generator 25 on the basis of the separated synchronizing signals. Further, the generated predetermined synchronous signals are applied to the tape speed signal generator 32 as the reference signal.

The tape speed signal generator 32 supplies the reference signal for setting the travel speed of the magnetic tape T at a predetermined value to the speed controller 33. To this speed controller 33, an FG signal and a PG signal are both supplied. This FG signal is generated by the signal generator 35 mounted on the rotary axle of the capstan motor 31 (i.e., FG signal is generated by a frequency power generator mounted on the signal generator 35). The PG signal is a rotation reference phase signal generated by the signal generator 35. This PG signal is amplified by the amplifier 36, and then supplied to the speed controller 33 through the record-reproduce selection switch 37 (i.e., the fixed contact R and the movable contact v).

The speed controller 33 drives the magnetic tape T at a travel speed required for each operation mode on the basis of the reference tape speed signal generated by the tape speed signal generator 32. Further, the speed controller 33 generates a control signal (error signal) for controlling the rotational state of the capstan motor 31, and supplies the generated control signal to the drive amplifier 34. Thus, the time position of the vertical synchronizing signal of the video signals to be recorded or the time position of the reference signal generated on the basis of the time reference value extracted from the digital data bit stream can satisfy predetermined phase relationship. Further, when the capstan motor 31 is driven by the output signal of the drive amplifier 34, it is possible to move the magnetic tape T in a travel direction "b" or the opposite direction at a travel speed required for the set operation mode.

Figure 6A:
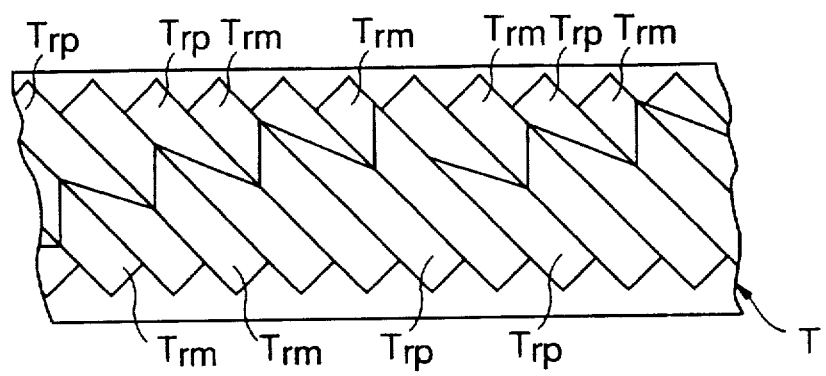
FIGS. 6A and 6B are illustrations for assistance in explaining a recorded trace pattern formed on the recorded magnetic tape, respectively.
Figure 6B:
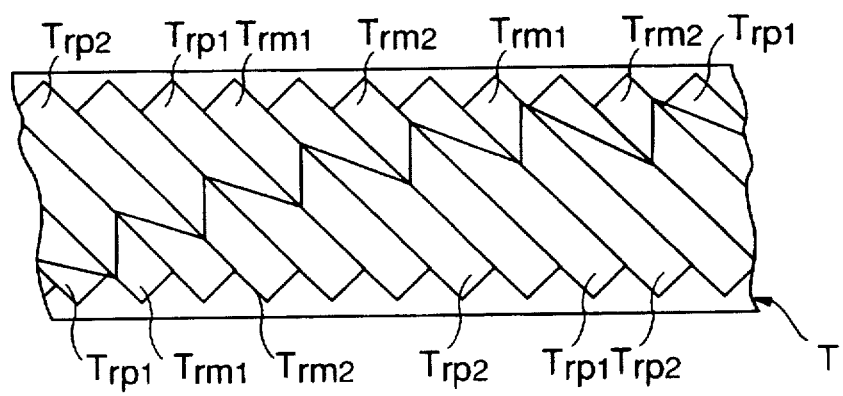

In the case where the apparatus is set to the recording operation mode, the control pulse generated by the control signal generator 25 is supplied to the control head 15 via the fixed contact R and the movable contact v of the record-reproduce selection switch 38. The control pulse is then recorded on the control track formed in the vicinity of the reference edge Te of the magnetic tape T moving in the arrow direction "b" in FIG. 2. Further, in the record operation mode, the recorded signals are output from the record signal processor 26 and then supplied to the rotary magnetic heads via the record-reproduce selection switch 39 (the fixed contract R and the movable contact v) and a rotary transformer (not shown). Therefore, the supplied recorded signals are recorded on the magnetic tape T moving continuously at a predetermined travel speed by the rotary magnetic heads, so that parallel video tracks as shown in FIGS. 6A and 6B can be formed on the magnetic tape T. A signal line 54 shown in FIG. 3 indicates that a selection control signal is applied to the head selection switch (not shown). Further, in the record-reproduce selection switch 39, the numbers of the two fixed contacts R and P and the movable contacts V are determined to be the same as the number of the signals to be recorded simultaneously.

Further, when the apparatus shown in FIG. 3 is in the reproduction operation mode, a desired reproduction mode selected from a plurality of sorts of the reproduction modes is input to the operation section 23. On the basis of the input reproduction mode, the control section 24 controls the control signal generator 25 to generate various control signals required for the predetermined operations to be executed by the respective sections in accordance with the reproduction mode designated by the reproduction mode data input through the operation section 23.

Further, when the apparatus is in the reproduction mode, the control section 24 executes the control operation in such a way that the number of rotations of the rotary magnetic heads is set to that in the recording operation, and further the number of rotations of the rotary magnetic heads is controlled at the set number of rotations. Further, the capstan servo system executes the control operation in such a way that the travel speed and direction of the recorded magnetic tape T can be set to the values determined according to the selected reproduction mode, and further the recorded magnetic tape T can be moved at the set travel speed and in the set direction.

In the reproduction operation, the reference signal generated by the control signal generator 25 in correspondence to the selected reproduction mode is applied to the tape speed signal generator 32 of the capstan serve system for controlling the travel conditions of the recorded magnetic tape T. Further, the control signals reproduced by the control heads 15 are given to the speed controller 33 via the record-reproduce selection switch 37 (the fixed contact P and the movable contact v) together with the FG signal generated by the signal generator 35. Therefore, the recorded magnetic tape T rotated by the capstan motor 31 and pinched between the capstan 18 and a pinch roller (not shown) can be moved continuously at a travel speed and a travel direction both determined according to the selected reproduction mode.

Figure 4A:
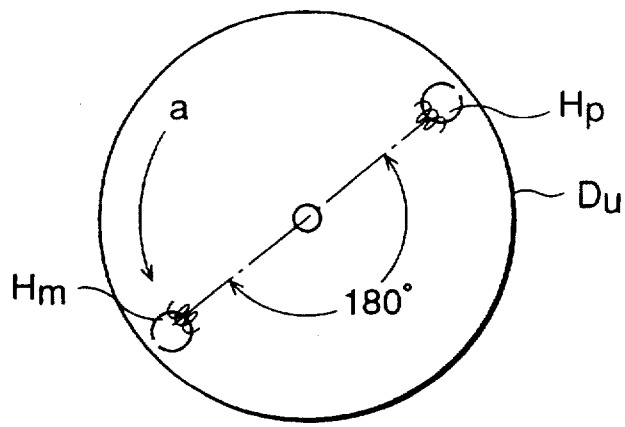
FIGS. 4A and 4B are a plane view and side view, respectively, showing an example of the rotary magnetic heads.
Figure 4B:
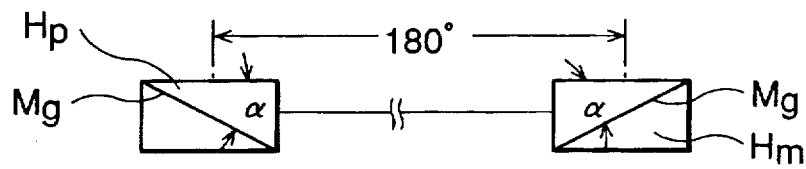
Figure 5A:
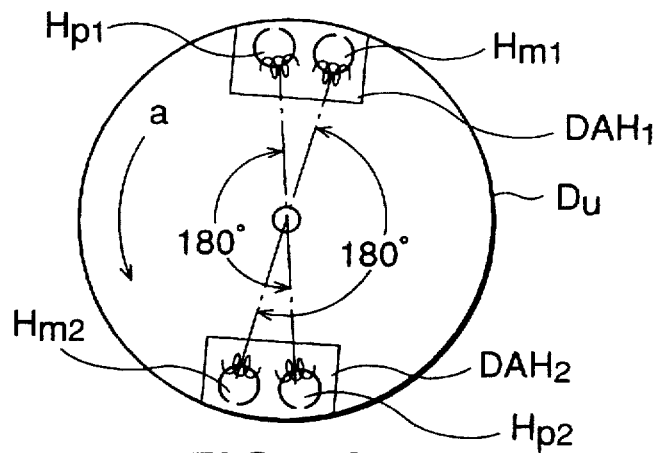
FIGS. 5A and 5B are a plane view and side view, respectively, showing another example of the rotary magnetic heads.
Figure 5B:
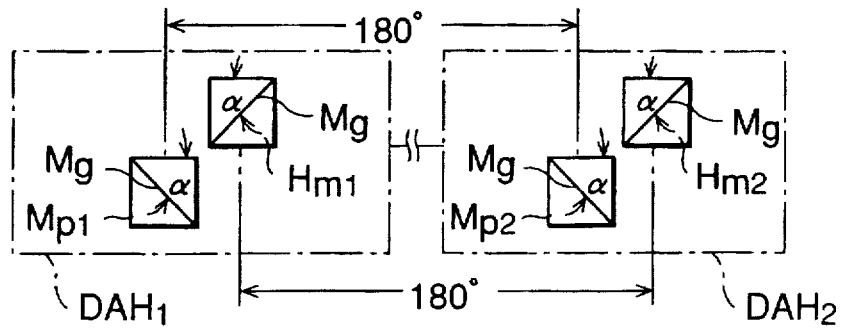

FIGS. 4A and 4B, and 5A and 5B show examples of the construction and the arrangement of the rotary magnetic heads used for the recording and reproducing operation of the magnetic recording and reproducing apparatus according to the present invention. More in detail, FIGS. 4A and 5A are plane views showing the arrangement of the two rotary magnetic heads mounted on the upper drum Du, and FIGS. 4B and 5B show the development indicative of the arrangement relationship between the respective rotary magnetic heads arranged on the upper drum Du. In the drawings, the rotary magnetic heads are denoted by Hp and Hm and Hp1, Hm1, Hp2 and Hm2. Each of the rotary magnetic heads Hp, Hp1, Hp2 (having a suffix p) has a magnetic gap Mg whose azimuth angle is set to a predetermined angle α less than 90 degrees in the clockwise direction with respect to the width direction of the recorded traces. Further each of the rotary magnetic heads Hm, Hm1, Hm2 (having a suffix m) has a magnetic gap Mg whose azimuth angle is set to a predetermined angle α less than 90 degrees in the counterclockwise direction with respect to the width direction of the recorded traces.

In FIGS. 4A and 4B, the two rotary magnetic heads Hp and Hm having the magnetic gap Mg of two different azimuth angles are mounted on the upper drum Du so as to be arranged on the circumference thereof in 180 degree symmetrical positional relationship. Further, DAH1 and DAH2 shown in FIGS. 5A and 5B denote a pair of rotary magnetic heads such that two rotary magnetic heads Hp1 and Hm1 (or Hp2 and Hm2) having two magnetic gaps Mg of mutually different azimuth angles are arranged at a predetermined minute distance away from each other.

In the two head pairs DAH1 and DAH2 mounted on the upper drum Du, the rotary magnetic head Hp1 of one head pair DAH1 and the rotary magnetic head Hp2 of the other head pair DAH2 are arranged at 180-degree symmetrical positions on the circumference of the upper drpm Du; and the rotary magnetic head Hm1 of one head pair DAH1 and the rotary magnetic head Hm2 of the other head pair DAH2 are arranged at 180-degree symmetrical positions on the circumference of the upper drum Du.

The azimuth angle α of the magnetic head Mg of each rotary magnetic head is set to a specific angle less than 90 degrees according to the occupied frequency range of the recorded signals and the other required conditions. When the recorded signals are the digital data bit stream, for instance, 30 degrees is set as the azimuth angle α of the magnetic gap Mg of each rotary magnetic head.

FIG. 6A shows a recorded trace (track) pattern obtained when signals are recorded on the magnetic tape T by use of the two rotary magnetic heads Hp and Hm arranged at 180-degree symmetrical positions on the circumference of the upper drum Du; and FIG. 6B shows a recorded trace (track) pattern obtained when signals are recorded on the magnetic tape T by use of a pair of the rotary magnetic heads Hp1 and Hm1 constituting the head pair DAH1 and a pair of the rotary magnetic heads Hp2 and Hm2 constituting the head pair DAH2 both arranged at 180-degree symmetrical positions on the circumference of the upper drum Du.

In FIG. 6A and 6B, Trp denotes the recorded traces (tracks) formed on the magnetic tape T by the rotary magnetic head Hp, and Trm denotes the recorded traces (tracks) formed on the magnetic tape T by the rotary magnetic head Hm. Further, Trp1 (Trp2) denotes the recorded traces (tracks) formed on the magnetic tape T by the rotary magnetic head Hp1 (Hp2), and Trm1 (Trm2) denotes the recorded traces (tracks) formed on the magnetic tape T by the rotary magnetic head Hm1 (Hm2). The recorded traces Trp1 and Trm1 are formed at the same time by the two rotary magnetic heads Hp1 and Hm1, and the recorded traces Trp2 and Trm2 are formed at the same time by the two rotary magnetic heads Hp2 and Hm2, respectively.

Now, there is a need to reproduce the recorded data under excellent conditions from the recorded traces formed on the recorded magnetic tape T in the reproduction operation when data signals are recorded on the magnetic tape T as the recorded traces by use of the rotary magnetic head having a magnetic gap Mg of a predetermined azimuth angle. In this case, it is necessary to use the rotary magnetic head having a magnetic gap Mg of roughly the same azimuth angle as that of the rotary magnetic head used in the recording operation, as is well known.

By the way, when the travel conditions of the recorded magnetic tape T in the reproduction operation differ from those in the record operation (i.e., any one or both of the magnetic tape travel speed and direction differ), the rotational locus of the rotary magnetic heads crosses the recorded traces formed on the recorded magnetic tape T, as already explained with reference to FIG. 1. However, even when the rotational locus of the rotary head crosses the recorded traces formed on the recorded magnetic tape T in the reproduction operation, it is possible to obtain the reproduced signals by use of the rotary magnetic head having the magnetic gap Mg of roughly the same azimuth angle as that of the rotary magnetic head used in the recording operation.

The reason is as follows: when any one or both of the travel speed and direction of the recorded magnetic tape T in the reproduction operation differ from those in the recording operation and thereby the rotational locus of the rotary magnetic head crosses the recorded traces formed on the recorded magnetic tape T, the rotational locus position of the rotary magnetic head (described in a space in the reproduction operation) is the same as the position of the rotational locus (as shown by a straight line between the start point and a zero point in FIG. 1 ) of the rotary magnetic head (described in the space in the recording operation). That is, the rotational locus described by the rotary magnetic head is the same in both the recording and reproduction operations. Further, the direction of the recorded traces formed on the recorded magnetic tape T (medium) will not at all change, irrespective of the travel speed and direction of the recorded magnetic tape.

However, when the travel conditions of the recorded magnetic tape T in the reproduction operation differ from those in the recording operation and thereby the rotational locus of the rotary magnetic heads used in the reproduction operation crosses the recorded traces formed on the recorded magnetic tape T, the reproduced signals are generated intermittently on the time axis. This is because the reproduced signals can be reproduced only when the rotary magnetic head having the magnetic gap Mg of roughly the same azimuth angle as that of the magnetic gap of the rotary magnetic heads used in the recording operation crosses the recorded traces formed on the magnetic tape T by the rotary magnetic head used in the recording operation.

By the way, when video signals are reproduced at a large multiple number of the magnetic tape travel speed as with the case where the apparatus is in the high speed search mode, the signals are reproduced intermittently from the recorded traces sequentially crossed by the rotary magnetic head. Because, the rotary magnetic head crosses the sequential recorded traces formed on the recorded magnetic tape. Therefore, it is necessary to extract the position data (e.g., digital data of track numbers) of the recorded traces and the control data included in the reproduced signals from the reproduced signals, in order to execute the predetermined operation. Accordingly, it is impossible to operate the magnetic recording and reproducing apparatus correctly, if the reproduced signals are not excellent with respect to S/N ratio.

Figures 7A, 7B:
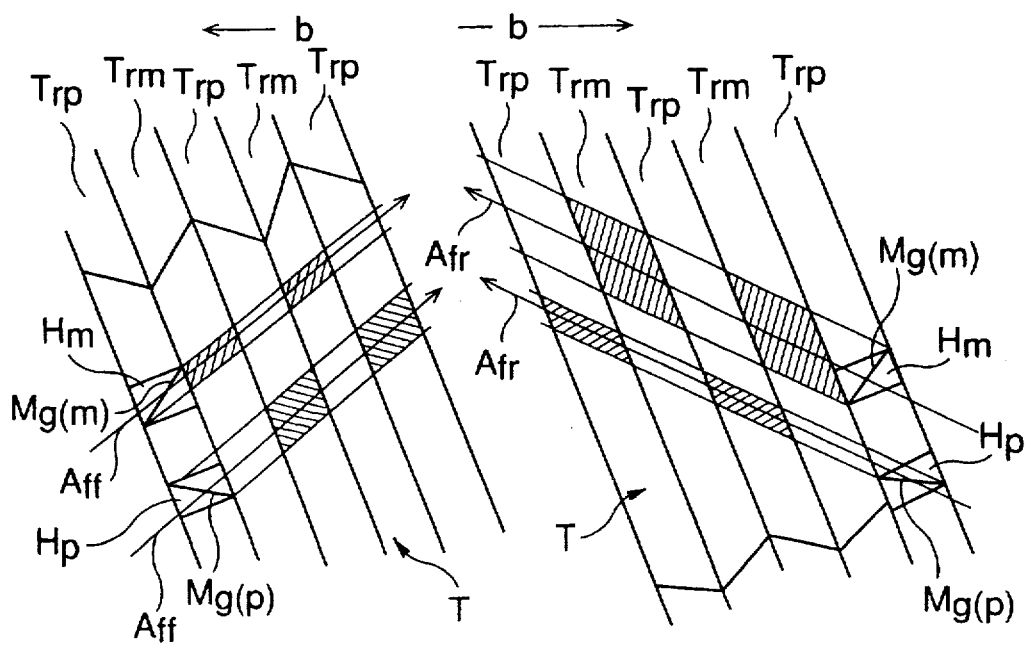
FIGS. 7A and 7B are illustrations each for assistance in explaining the state where the reproduced signal level changes according to both the directions of the recorded traces formed on the recorded magnetic tape and the rotational locus of the rotary magnetic heads.

FIG. 7A is an illustration for assistance in explaining a difference in the reproduced signal level between the two rotary magnetic heads Hp and Hm having two magnetic gaps Mg(p) and Mg(m) of two different azimuth angles, obtained in an FF state (mode) such that the recorded magnetic tape T is moved in the travel direction (forward direction) the same as that in the recording operation and at a travel speed higher than that in the recording operation. Further, FIG. 7B is an illustration for assistance in explaining a difference in the reproduced signal level between the two rotary magnetic heads Hp and Hm having two magnetic gaps Mg(p) and Mg(m) of two different azimuth angles, in an (FR) state (mode) such that the recorded magnetic tape T is moved in the travel direction (reverse direction) opposite to that in the recording operation and a travel speed higher than that in the recording operation.

In FIGS. 7A and 7B, Trp, Trp, . . . , indicate the recorded signal traces formed by the rotary magnetic head Hp having a magnetic gap Mg(p) set to a predetermined azimuth angle α less than 90 degrees in the clockwise direction with respect to the width direction; and Trm, Trm, . . . , indicate the recorded signal traces formed by the rotary magnetic head Hm having a magnetic gap Mg(m) set to a predetermined azimuth angle α less than 90 degrees in the counterclockwise direction with respect to the width direction. Further, in FIG. 7A, an arrow Aff indicates the rotational locus of the rotary magnetic head obtained in the reproduction operation, in the case (FF) where the recorded magnetic tape T is moved in the forward direction (the arrow direction "b") the same as that in the recording operation and at a travel speed higher than that in the recording operation. Further, in FIG. 7B, an arrow Afr indicates the rotational locus of the rotary magnetic head obtained in the reproduction operation, in the case (FR) where the recorded magnetic tape T is moved in the reverse direction (the arrow direction "-b") opposite to that in the recording operation and at a travel speed higher than that in the recording operation.

In comparison between FIGS. 7A and 7B, first, there is a case of the reproduction operation mode (FF) where the recorded magnetic tape T is moved in the forward direction (the arrow direction "b") the same as that in the recording operation and at a travel speed higher than that in the recording operation. In this case, the rotary magnetic head Hp having the magnetic gap Mg(p) set to a predetermined azimuth angle α less than 90 degrees in the clockwise direction with respect to the width direction of the recorded traces can scan the recorded traces over a wider area, as compared with the rotary magnetic head Hm having the magnetic gap Mg(m) set to a predetermined azimuth angle α less than 90 degrees in the counterclockwise direction with respect to the width direction of the recorded trace. Further, there is a case of the reproduction operation mode (FR) where the recorded magnetic tape T is moved in the reverse direction opposite to that in the recording operation and at a travel speed higher than that in the recording operation. In this case, the rotary magnetic head Hm having the magnetic gap Mg(m) set to a predetermined azimuth angle a less than 90 degrees in the counterclockwise direction with respect to the width direction of the recorded trace can scan the recorded traces over a wider area, as compared with the rotary magnetic head Hp having the magnetic gap Mg(p) set to a predetermined azimuth angle α less than 90 degrees in the clockwise direction with respect to the width direction of the recorded trace.

Therefore, the magnetic recording and reproducing apparatus according to the present invention is characterized in that: a rotary magnetic head Hp having a magnetic gap Mg(p) set to a predetermined azimuth angle α less than 90 degrees in the clockwise direction with respect to the width direction of the recorded traces Tr and a rotary magnetic head Hm having a magnetic gap Mg(m) set to a predetermined azimuth angle a less than 90 degrees in the counterclockwise direction with respect to the width direction of the recorded traces Tr are both rotated at a predetermined number of rotations, respectively; in recording operation, recorded traces Trp and Trm are formed on the magnetic tape T moving in the forward direction at a predetermined travel speed in accordance with a rotational locus of the rotary magnetic heads moving and obliquely crossing the travel direction of the magnetic tape T; in reproduction operation, the recorded magnetic tape T is moved at a travel speed higher than that in the recording operation in a forward direction "b" or in a reverse direction "-b"; in the case (FF) where the rotational locus surface of the rotary magnetic heads changes in the reproduction operation within a angular range less than 180 degrees in the clockwise direction with respect to the recorded traces Tr formed on the recorded magnetic tape, control data included in output signals obtained by the rotary magnetic head Hp having the magnetic gap Mg(p) set to a predetermined azimuth angle α less than 90 degrees in the clockwise direction with respect to the width direction of the recorded traces Tr are selected by a reproduced signal processing section, and the selected control data are supplied to a control section; and in the case (FR) where the rotational locus surface of the rotary magnetic heads in the reproduction operation changes within a angular range less than 180 degrees in the counterclockwise direction with respect to the direction of the recorded traces Tr formed on the recorded magnetic tape, control data included in output signals obtained by the rotary magnetic head Hm having the magnetic gap Mg(m) set to a predetermined azimuth angle a less than 90 degrees in the counterclockwise direction with respect to the width direction of the recorded traces Tr are selected by the reproduced signal processing section, and the selected control data are supplied to the control section, in order to execute an excellent control operation.

Therefore, in the magnetic recording and reproducing apparatus according to the present invention, in the case of the reproduction operation such that the rotational locus of the rotary magnetic heads crosses the recorded traces formed on the recorded magnetic tape T, predetermined control operation is executed on the basis of the control data obtained by the output signals obtained by the predetermined rotary magnetic heads for outputting reproduced signals, in correspondence to the travel direction of the recorded magnetic tape in the reproduction operation.

As already explained with reference to FIG. 3, on the basis of the signals output by the signal controller 24, in the reproduction operation mode in which the rotational locus of the rotary magnetic heads crosses the recorded traces formed on the recorded magnetic tape T, control data included in the reproduced signals output by any one (which can outputs the reproduced signals of excellent S/N ratio) of the rotary magnetic heads are selected by a reproduced signal processor 40 from the signals reproduced by the rotary magnetic heads and supplied to the processor 40 via a head selection switch (not shown) and the record-reproduce selection switch 39 (the movable contact v and the fixed contact P), on the basis of the data indicative of the travel direction of the magnetic tape and the drum rotation reference phase signal at the respective time. This is because, the DFF signal (drum rotation reference phase signal) generated by the control signal generator 25 indicates the rotational phase (rotational phase of the upper drum Du) of the rotary magnetic heads Hp and Hm (or Hp1, Hm1, Hp2 and Hm2 shown in FIGS. 5A and 5B.) The travel direction indicating data is supplied from the operation section 23 to the signal controller 24 and further to the reproduced signal processor 40.

Therefore, in the case where the rotary magnetic heads used for the magnetic recording and reproducing apparatus as shown in FIG. 3 are the rotary magnetic heads Hp and Hm having two magnetic gaps Mg of two different azimuth angles as shown in FIGS. 4A and 4B and arranged at two 180-degree symmetrical positions on the circumference of the upper drum Du, only the control data included in the output signals obtained by the rotary magnetic head Hp having the magnetic gap Mg of the azimuth angle α set to a predetermined angle less than 90 degrees in the clockwise direction with respect to the width direction of the recorded traces Tr are selected by the reproduction signal processor 40 and then supplied to the controller 24. This happens in the reproduction operation mode such that the rotational locus of the rotary magnetic heads crosses the recorded traces formed on the recorded magnetic tape T and further in the FF mode such that the recorded magnetic tape T is moved in the forward direction. Further, in the same conditions as above, in the FR mode such that the recorded magnetic tape T is moved in the reverse direction, only the control data included in the output signals obtained by the rotary magnetic head Hm having the magnetic gap Mg of the azimuth angle α set to a predetermined angle less than 90 degrees in the counterclockwise direction with respect to the width direction of the recorded traces Tr are selected by the reproduction signal processor 40 and then supplied to the controller 24.

Further, in the case where the rotary magnetic heads used for the magnetic recording and reproducing apparatus as shown in FIG. 3 are the two pairs of the rotary magnetic heads DAH1 and DAH2 arranged at two 180 degree symmetrical positions on the circumference of the upper drum Du as shown in FIGS. 5A and 5B, only the control data included in the output signals obtained by the rotary magnetic head Hp1 of the head pair DAH1 having the magnetic gap Mg of the azimuth angle α set to a predetermined angle less than 90 degrees in the clockwise direction with respect to the width direction of the recorded traces Tr are selected by the reproduction signal processor 40 and then supplied to the controller 24. This happens in the reproduction operation mode such that the rotational locus of the rotary magnetic heads crosses the recorded traces formed on the recorded magnetic tape T and further in the FF mode such that the recorded magnetic tape T is moved in the forward direction. In addition, only the control data included in the output signals obtained by the rotary magnetic head Hp2 of the head pair DAH2 are selected by the reproduction signal processor 40 and then supplied to the controller 24.

Further, in the same way, in the case where the rotary magnetic heads used for the magnetic recording and reproducing apparatus as shown in FIG. 3 are the two pairs of the rotary magnetic heads DAH1 and DAH2 arranged at two 180 degree symmetrical positions on the circumference of the upper drum Du as shown in FIGS. 5A and 5B, only the control data included in the output signals obtained by the rotary magnetic head Hm1 of the head pair DAH1 having the magnetic gap Mg of the azimuth angle α set to a predetermined angle less than 90 degrees in the recorded magnetic tape T is moved in the reverse direction. Further, in the same way, only the control data included in the output signals obtained by the rotary magnetic head Hm2 of the head pair DAH2 are selected by the reproduction signal processor 40 and then supplied to the controller 24.

As described above, in the magnetic recording and reproducing apparatus according to the present invention, it is possible to control the reproduction operation of the magnetic recording and reproducing apparatus under excellent conditions. This is because only the position data of the recorded traces and the control data of the apparatus both included in the reproduced signals of an excellent S/N ratio are selected from the reproduced signals supplied to the reproduced signal processor 40 via the record-reproduce selection switch 39 (the movable contact v and the fixed contact P).

Next, in the magnetic recording and reproducing apparatus which can record and reproduce both analog video signals and digital signals of a bit stream, the reproduction operation executed under such condition that the recorded magnetic tape is moved at a travel speed much higher than that in the recording operation will be explained hereinbelow.

Conventionally, the helical scanning type magnetic recording and reproducing apparatus has been widely used in practice as the video signal recording and reproducing apparatus (video cassette recorder VCR) using a magnetic cassette tape, in which a rotary magnetic head having a magnetic gap having a predetermined azimuth angle set to a predetermined angle less than 90 degrees in the clockwise direction with respect to the width direction of the recorded traces and another rotary magnetic head having a magnetic gap having a predetermined azimuth angle set to a predetermined angle less than 90 degrees in the counterclockwise direction with respect to the width direction of the recorded traces are both rotated at a predetermined number of rotations; data are recorded on the recorded traces of the magnetic tape moving at a predetermined travel speed and in the forward direction in accordance with the rotational locus of the rotary magnetic heads moving and obliquely crossing the travel direction of the magnetic tape; and further the recorded data are reproduced from the recorded magnetic tape.

Here, although the above-mentioned VCR has been used to record and reproduce analog signals, it has been considered to use this VCR as a digital data memory of large capacity for a digital apparatus, because the memory capacity of the cassette tape is large. Recently, on the other hand, a VCR of D-VHS system has been proposed such that the mechanical section of the VCR of S-VHS system (Trademark) is used as it is, so as to have interchangeability with the current VHS system and additionally to record and reproduce the digital data bit stream supplied through a digital interface.

Figure 8:
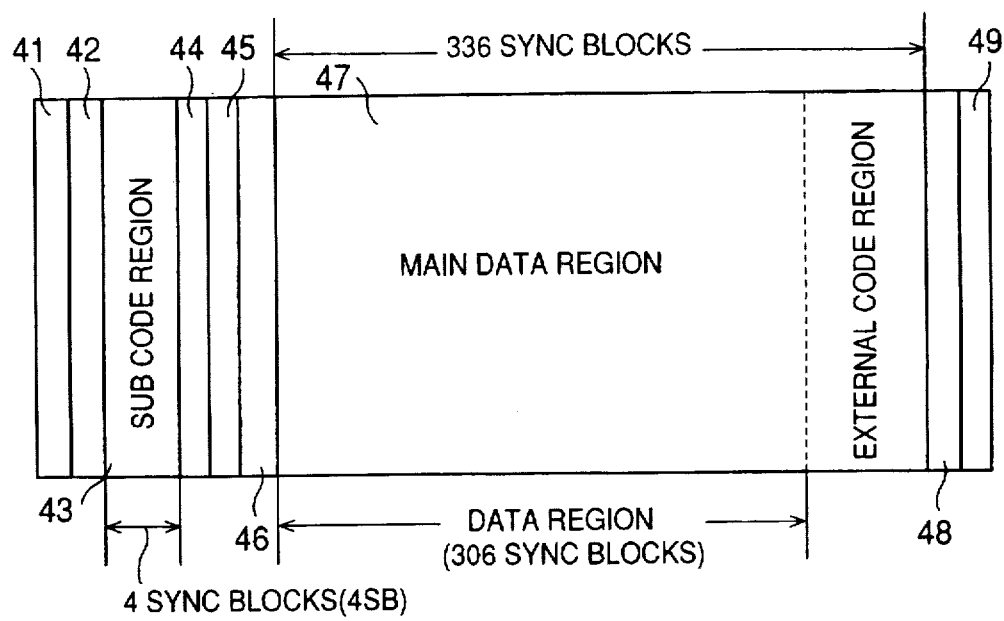
FIG. 8 is an illustration showing a recording format.

In the above-mentioned VCR of D-VHS system, digital data are recorded along a single recorded trace (track) formed on the magnetic tape in correspondence to the 180-degree rotation of the rotary magnetic head. Here, the recording format of this recorded trace (track) is constructed by arranging a margin region 41, a preamble region 42, a subcode region 43, a post-amble region 44, an IBG region 45, a preamble region 46, a main data region 47, an post-amble region 48, and a margin region 49 in sequence, as shown in FIG. 8.

The main region 47 has a data region and an error correcting code region, and composed of 336 sync (synchronous) blocks of synch block Nos. from 0 to 335. In the main data region 47, the data region is set to 306 sync blocks (a multiple number of six). Further, the error correcting code region is 30 sync blocks for recording an external code (C3 code) for error correction.

Figure 9:
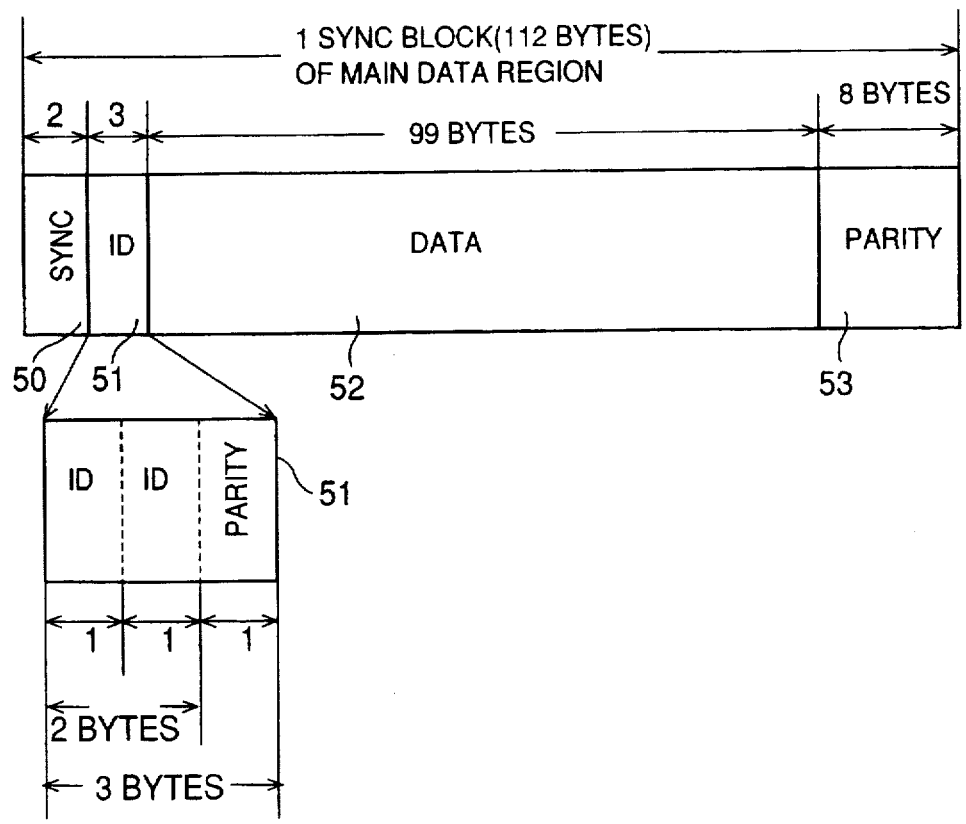
FIG. 9 is an illustration showing an example of the sync (synchronous) block construction of the principal data region.

Further, FIG. 9 shows an example of the sync block format of the main dada region. In FIG. 9, 50 denotes a two-byte sync data region for reproducing sync blocks; 51 denotes a three-byte address data (ID) region; 52 denotes a 99-byte substantial data storing region including a header; and 53 denotes an eight-byte parity region for correcting an error of the sync block. Further, one sync block is composed of 112 bytes. Further, the three-byte address data (ID) region 51 is composed of a two-byte ID region (identification data for discriminating 336 sync blocks and identification data for discriminating six recorded traces), and one-type parity region.

Figure 10:
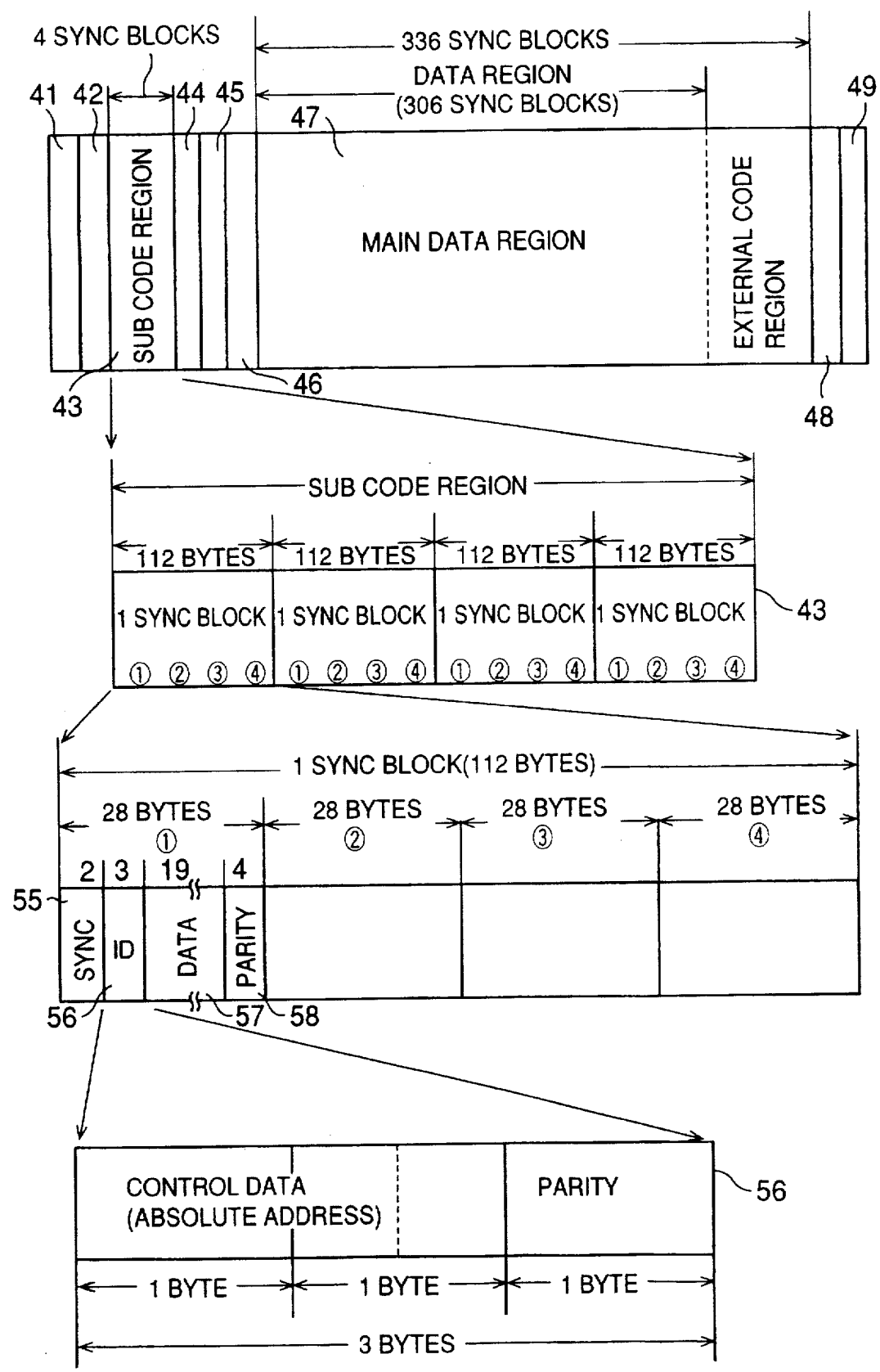
FIG. 10 is an illustration showing an example of the sync block constructions of the record format and the subcode region, respectively.

FIG. 10 shows the practical contents of the subcode region 43 of the recording format (shown in FIG. 8) of a single record trace (track) formed on the magnetic tape in correspondence to the 180-degree rotation of the rotary magnetic head. In FIG. 10, the subcode region 43 is composed of four sync blocks (4SB), and each sync block is composed of four 28-byte portions 1, 2, 3 and 4. Each portion 1, 2, 3 or 4 of 28-byte is composed of two-byte sync data 55, three-byte ID 56, 19-byte data 57, and four-byte parity 58.

Further, two-byte portion of the three-byte ID 56 in each 28-byte portion is composed of control data (e.g., data for obtaining an absolute data) and the other necessary data. Further, the remaining one-byte portion is parity data. Here, the data for obtaining the absolute address in the two-type portion of the ID 56 provided for each of the four portions 1, 2, 3 and 4 (each composed of 28 bytes) indicates a specific absolute address when all of these data are collected together.

Further, in each sync block of the four 112-byte sync blocks for constituting the subcode region 43 in the recording format of a specific recorded trace, the data for obtaining the absolute address in the two-byte portion of the ID 56 provided for each of the four portions 1, 2, 3 and 4 for constituting each single sync block are determined the same with respect to each other, in order to indicate the same absolute address determined according to the specific recorded trace.

Now, in the magnetic recording and reproducing apparatus which can record and reproduce the digital data bit stream, the recorded signals are reproduced whenever the rotary magnetic heads cross the recorded traces formed on the magnetic tape when the reproduction operation is executed in such a state that the magnetic tape on which the digital data bit stream is recorded in accordance with the recording format as described above is moved at a travel speed much higher than that in the recording operation, as with the case of high speed search mode (a multiple number speed mode reproduction). Further, in the above-mentioned reproduction operation mode, as already explained, reproduced signals can be generated along the recorded traces by only the rotary magnetic head (having the magnetic gap of the same azimuth angle as that of the magnetic gap of the rotary magnetic head used in the recording operation) from among the rotary magnetic heads moving and obliquely crossing the recorded magnetic tape.

By the way, when the reproduction operation is executed in a state where the multiple number of the magnetic tape travel speed is large, it is possible to read the absolute address data (an example of the control data) recorded on the recorded traces at a high probability, even if signals are reproduced when the rotary magnetic heads cross the sequential recorded traces formed on the recorded magnetic tape in a short time, although the rotary magnetic heads cross the sequential recorded traces formed on the recorded magnetic tape in a short time. This is because data are recorded on the recorded traces of the recorded magnetic tape in accordance with the above-mentioned recorded format; that is, the subcode regions 43 (in which the same absolute address is recorded several times repeatedly) is provided for each recorded trace.

Next, in the magnetic recording and reproducing apparatus according to the present invention, the recording format used for the analog video signals of composite color video signals (e.g., for both NTSC system and PAL system) will be described hereinbelow. In this analog video signals, chrominance carrier signals orthogonal two-phase modulated by two color difference signals are covalent-multiplexed with the luminance signals in the occupied frequency band of the luminance signals; after the luminance signals have been separated from the chrominance carrier signals, the chrominance signals are frequency modulated, and the chrominance carrier signals are converted into low frequency band chrominance carrier signals so as to be located in the lower frequency band of the occupied frequency band of the frequency modulated luminance signals; and the frequency modulated luminance signals and lower frequency band converted chrominance carrier signals are frequency multiplexed.

As described above, in the case where the analog video signals to be recorded and reproduced are the frequency multiplexed video signals of the frequency modulated luminance signals and the low-frequency converted chrominance carrier signals, if a program is required to be reproduced from the head thereof, it is indispensable to record the absolute address (one of the control data) in the recorded trace. In addition, in the program head selection operation, it is necessary to record the control data for decreasing the travel speed of the recorded magnetic tape or stopping the recorded magnetic tape at any desired recorded positions of the recorded program.

In the case where the composite video signals as described above are recorded or reproduced by the helical scanning type magnetic recording and reproducing apparatus, the relationship between the vertical scanning interval of the composite video signals and the rotational interval of the rotary magnetic heads is determined in a specific integer ratio, so that the composite video signals for one vertical scanning period can be recorded on a single recorded trace formed on the magnetic tape.

Therefore, the blanking interval including the vertical synchronizing signals are also recorded on a single recorded trace formed on the magnetic tape. It is thus possible to insert digital control data, for instance after the vertical synchronizing signal at the blanking interval.

Here, when the recorded magnetic tape on which the composite video signals including the digital control data are inserted as described above is moved in the reproduction operation at a travel speed much higher than that in the recording operation (at a large multiple number tape travel speed) as in the high speed search mode, the reproduction operation is executed when the rotary magnetic head obliquely crosses the recorded trace formed on the recorded magnetic tape. In this case, the reproduced signals are generated by only the rotary magnetic head having the magnetic gap Mg of roughly the same azimuth angle as that of the rotary magnetic head used in the recording operation, from among the other rotary magnetic heads moving and obliquely crossing the recorded magnetic tape, as already explained.

By the way, when the reproduction operation is executed at a high tape travel speed of a large multiple number, it is possible to read the control data recorded on the recorded traces at a high probability even if the reproduction operation is executed on condition that the rotary magnetic heads cross the sequential recorded traces formed on the magnetic tape in a short time, although the rotary magnetic heads cross the sequential recorded traces formed on the magnetic tape in a short time. This is because the control data as described above are recorded on the recorded traces formed on the recorded magnetic tape.

Therefore, in the magnetic recording and reproducing apparatus according to the present invention, even when the analog video signals recorded on the magnetic tape are reproduced or when the digital data bit stream recorded on the magnetic tape is reproduced, the control data included in the output signals obtained by the rotary magnetic head having the magnetic gap of the azimuth angle set to a predetermined angle less than 90 degrees in the clockwise direction with respect to the width direction of the recorded traces are selected by the reproduction signal processor 40 and then supplied to the controller 24. This happens in the reproduction operation (FF) such that the recorded magnetic tape T is moved in the same travel direction (forward direction) as that in the recording operation and a travel speed higher than that in the recording operation. Further, in the reproduction operation (FR) such that the recorded magnetic tape T is moved in the travel direction (reverse direction) opposite to that in the recording direction and a travel speed higher than that in the recording operation, the control data included in the output signals obtained by the rotary magnetic head having the magnetic gap of the azimuth angle set to a predetermined angle less than 90 degrees in the counterclockwise direction with respect to the width direction of the recorded traces are selected by the reproduction signal processor 40 and then supplied to the controller 24.

Figure 11:
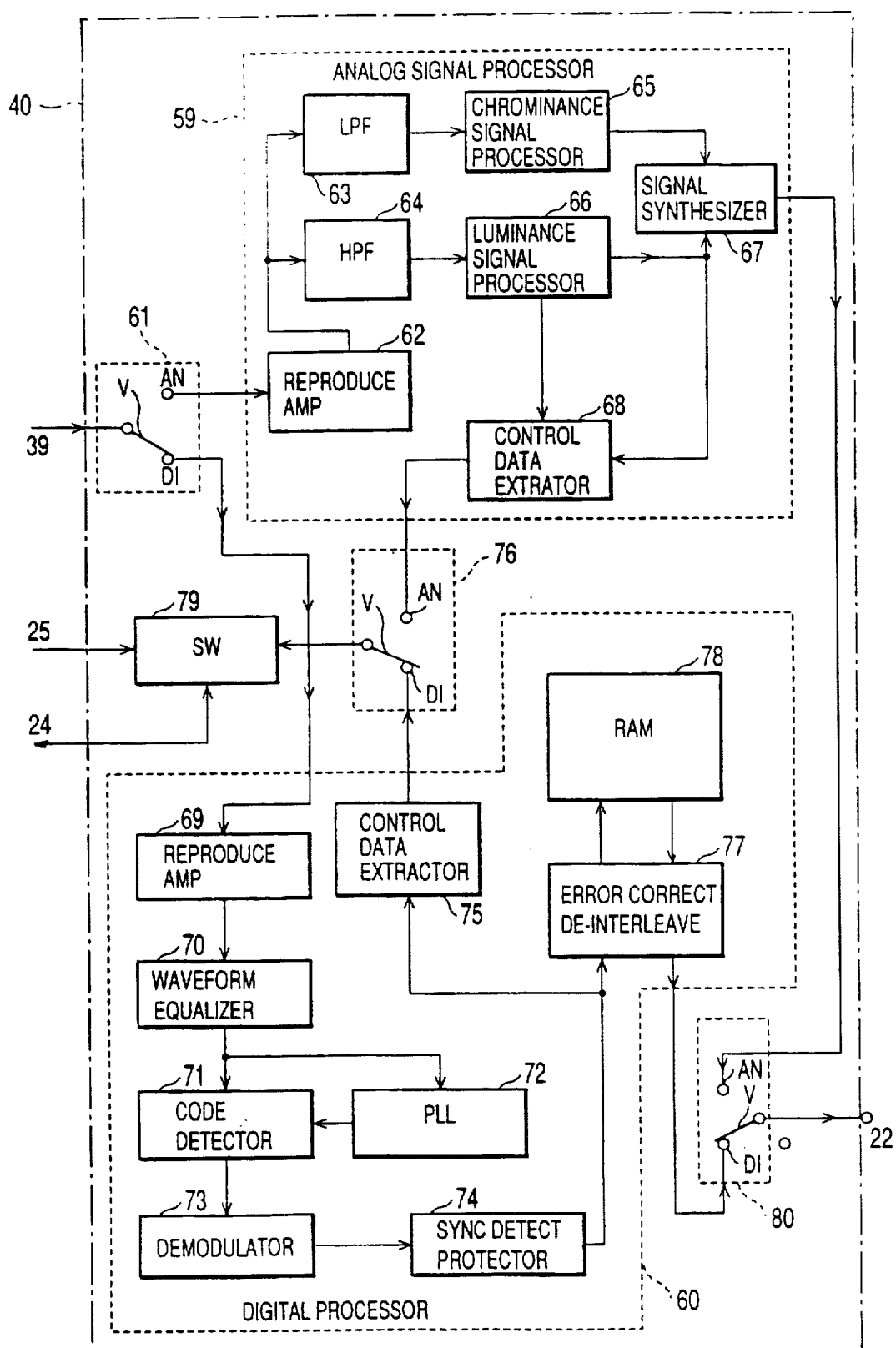
FIG. 11 is a block diagram showing a reproduced signal processing section.

FIG. 11 shows a practical example of the reproduced signal processor 40. The control operation of the processor for extracting the control data included in the output signals reproduced by the rotary magnetic head under excellent condition will be described hereinbelow.

In FIG. 11, when the magnetic recording and reproducing apparatus reproduces video signals from the recorded magnetic tape on which the digital data bit stream is recorded, in each of three selection switches 61, 76 and 80, a movable contact v thereof is set to a fixed contact D1 thereof on the basis of a switch control signal supplied by the control signal generator 25 (See FIG. 3). Further, when the magnetic recording and reproducing apparatus reproduces video signals from the recorded magnetic tape on which composite video signals are recorded, in each of three selection switches 61, 76 and 80, the movable contact is set to a fixed contact AN thereof on the basis of the switch control signal supplied by the control signal generator 25 (See FIG. 3).

The fixed contact AN of the selection switch 61 is connected to an input side of a reproduce amplifier 62 of an analog signal processor 59, and the fixed contact D1 of the selection switch 61 is connected to an input side of a reproduce amplifier 62 of a digital processor 60. The analog signal processor 59 separates the reproduced composite video signal output by the reproduce amplifier 62 to the low frequency band converted chrominance carrier signal and the frequency modulated luminance signal by a low pass filter LPF 63 and a high pass filter HPF 64. The low frequency band converted chrominance carrier signal is applied to a chrominance signal processor 65, and the frequency modulated luminance signal is applied to a luminance signal processor 66.

The chrominance signal processor 65 and luminance signal processor 66 both execute the well known predetermined signal processing operation, respectively. The predetermined chrominance signal output by the chrominance signal processor 65 and the luminance signal output by the luminance signal processor 66 are synthesized by a signal synthesizer 67 into composite color video signals, and then supplied to the fixed contact AN of the selection switch 80. Further, the output signal of the luminance signal processor 66 is also supplied to a control data extractor 68. To this extractor 68, the vertical synchronizing signal is also supplied from the luminance signal processor 66. The control data extractor 68 extracts the control data inserted at the blanking interval of the composite video signals on basis of a gate signal (for extracting the control data) generated on the basis of the vertical synchronizing signal. The control data can be obtained as the output signal of an AND circuit, when the composite video signal and the gate signal for extracting the control data are applied to the AND circuit. The control data output by the control data extractor 68 are applied to the fixed contact AN of the selection switch 76.

Further, when the movable contact v of the selection switch 61 is set to the fixed contact DI and further the reproduced digital data bit stream is supplied to the reproduce amplifier 69 of the digital data processor 60, the digital data bit stream output by the reproduce amplifier 69 is supplied to a waveform equalizer 70 for waveform equalization, and then supplied to a phase locked loop 72 and a code detector 71.

The code detector 71 detects codes from the digital data bit stream supplied by the waveform equalizer 70 on the basis of the bit rate signal supplied by the phase locked loop 72. After the output signal of the code detector 71 has been demodulated by a demodulator 73, the synchronous detection of the demodulated signal is protected by a synchronous detect protector 74.

The digital data output by the synchronous detect protector 74 are supplied to an error correct de-interleave circuit 77 and a control data extractor 75. The error correct de-interleave circuit 77 transmits and receives digital data to and from a random access memory 78 to execute error correction operation and de-interleave operation, to supply non-error output digital data to the fixed contact DI of the selection switch 80.

Further, the control data extractor 75 to which the digital data output from the synchronous detect protector 74 are supplied extracts the control data (e.g., data for obtaining absolute address, and the other data) from the already explained subcode region, and supplies the extracted control data to the fixed contact DI of the selection switch 76.

When the composite video signals are recorded on the magnetic tape, the movable contact v of the selection switch 76 is set to the fixed contact AN thereof by the witch control signal supplied by the control signal generator 25 (See FIG. 3). Further, when the digital data bit streams are recorded on the magnetic tape, the movable contact v of the selection switch 76 is set to the fixed contact DI thereof by the switch control signal supplied by the control signal generator 25 (See FIG. 3). Therefore, in any of the operation modes, the control data output by the control data extractor 68 or the control data extractor 75 are supplied from the movable contact v to a switch circuit 79.

To this switch circuit 79, a rotation reference phase signal (DFF) is supplied from the control signal generator 25. Further, a speed signal (data indicative of a multiple number of the tape travel speed and direction in the reproduction operation in comparison with that in the recording operation) is applied from the controller 24 (shown in FIG. 3).

Therefore, on the basis of both the drum rotation reference phase signal (DFF) and the speed signal, the switch circuit 79 selects the control data as follows: in the reproduction operation mode such that the recorded magnetic tape T is moved in the forward direction at a speed higher than that in the recording operation, the control signal obtained from the reproduced signals generated by the rotary magnetic head having the magnetic gap of a predetermined azimuth angle a less than 90 degrees in the clockwise direction with respect to the width direction of the recorded trace can be supplied to the controller 24 via the switch circuit 79. Further, in the reproduction operation mode such that the recorded magnetic tape T is moved in the reverse direction at a speed higher than that in the recording operation, the control signal obtained from the reproduced signals generated by the rotary magnetic head having the magnetic gap of a predetermined azimuth angle α less than 90 degrees in the counterclockwise direction with respect to the width direction of the recorded trace can be supplied to the controller 24 via the switch circuit 79.

FIGS. 12A to 12D show the control data selected by the switching circuit 79 as follows: in the recording and reproducing apparatus (as shown in FIG. 3) provided with two rotary magnetic heads Hp and Hm having two different magnetic gaps Mg of two different azimuth angles, respectively (as shown in FIGS. 4A and 4B, when the reproduction operation is executed by moving the recorded magnetic tape T in the forward direction (FF) at a speed higher than that in the recording operation, only the control data included in the output signal obtained by the rotary magnetic head Hp having the magnetic gap Mg set to a predetermined azimuth angle α less than 90 degrees in the clockwise direction with respect to the width direction of the recorded trace Tr are selected by the switch circuit 79; and further when the reproduction operation is executed by moving the recorded magnetic tape T in the reverse direction (FR) at a speed higher than that in the recording operation, only the control data included in the output signal obtained by the rotary magnetic head Hm having the magnetic gap Mg set to a predetermined azimuth angle α less than 90 degrees in the counterclockwise direction with respect to the width direction of the recorded trace Tr are selected by the switch circuit 79.

Further, FIGS. 13A to 13D show the control data selected by the switching circuit 79 as follows: in the recording and reproducing apparatus (as shown in FIG. 3) provided with two head pairs DAH1 and DAH2 mounted at two 180-degree symmetrical positions on the upper drum Du (as shown in FIGS. 5A and 5B), when the reproduction operation is executed by moving the recorded magnetic tape T in the forward direction (FF) at a speed higher than that in the recording operation, only the control data included in the output signals obtained by the rotary magnetic head Hp1 of the head pair DAH1 and the rotary magnetic head Hp2 of the head pair DAH2 each having the magnetic gap Mg set to a predetermined azimuth angle α less than 90 degrees in the clockwise direction with respect to the width direction of the recorded trace Tr are selected by the switch circuit 79; and further when the reproduction operation is executed by moving the recorded magnetic tape T in the reverse direction (FR) at a speed higher than that in the recording operation, only the control data included in the output signals obtained by the rotary magnetic head Hm1 of the head pair DAH1 and the rotary magnetic head Hm2 of the head pair DAH2 each having the magnetic gap Mg set to a predetermined azimuth angle a less than 90 degrees in the counterclockwise direction with respect to the width direction of the recorded trace Tr are selected by the switch circuit 79.

In FIGS. 12A and 13A denote the drum rotation reference phase signal DFF supplied to the control signal generator 25 (shown in FIG. 3) via the switch circuit 79 (shown in FIG. 11), and further FIGS. 12B and 13B denote the speed signal supplied from the controller 24 (shown in FIG. 3) to the switch circuit 79. Further, FIGS. 12C and 13C denote the signal reproduce intervals of each rotary magnetic head; FIGS. 12D and 13D denote the control signals extracted from the reproduce signals obtained by the rotary magnetic heads, selected by the switch circuit 79, and then supplied to the controller 24, in which Shp, Shm, Shp1 Shp2, Shm1, and Shm2 denote a selected control signal, respectively.

Here, the control signal Shp represents the control signal extracted from the signals reproduced by the rotary magnetic head Hp; the control signal Shm represents the control signal extracted from the signals reproduced by the rotary magnetic head Hm; in the same way, the control signals Shp1, Shp2, Shm1 and Shm2 represent the control signal extracted from the signals reproduced by the rotary magnetic heads Hp1, Hp2, Hm1 and Hm2, respectively.

As described above, the controller 24 to which the control data are supplied executes the control operation of the respective composing portions of the magnetic recording and reproducing apparatus on the basis of the selected control signals. Further, in the reproduced signal processor 40 shown in FIG. 11, for brevity there is shown a reproducing system required for when the reproduction operation is executed by use of the two rotary magnetic heads Hm and Hp arranged at two 180 degree symmetrical positions on the circumference of the upper drum Du (as shown in FIGS. 4A and 4B). However, when the recording and reproducing apparatus according to the present invention is provided with two head pairs DAH1 and DAH2 composed of the four rotary magnetic heads Hm1, Hp1, Hm2, and Hp2 arranged at two 180 degree symmetrical positions on the circumference of the upper drum Du (as shown in FIGS. 5A and 5B), two pairs of the analog signal processor 59 and two pairs of the digital data processor 60 (as shown in FIG. 11) are of course provided for the reproducing system.

As described above, in the recording and reproducing apparatus according to the present invention, in the case of the reproduction mode such that the recorded magnetic tape is moved in the forward direction at a travel speed higher than that in the recording operation, the rotary magnetic head having the magnetic gap set to a predetermined azimuth angle a less than 90 degree in the clockwise direction with respect to the width direction of the recorded traces can scan the recorded traces over an area wider than that scanned by the rotary magnetic head having the magnetic gap set to a predetermined azimuth angle α less than 90 degree in the counterclockwise direction with respect to the width direction of the recorded traces.

On the other hand, in the case of the reproduction mode such that the recorded magnetic tape is moved in the reverse direction at a travel speed higher than that in the recording operation, the rotary magnetic head having the magnetic gap set to a predetermined azimuth angle α less than 90 degree in the counterclockwise direction with respect to the width direction of the recorded traces can scan the recorded traces over an area wider than that scanned by the rotary magnetic head having the magnetic gap set to a predetermined azimuth angle a less than 90 degree in the clockwise direction with respect to the width direction of the recorded traces.

By utilizing the above-mentioned fact, the rotary magnetic head having the magnetic gaps set to a predetermined azimuth angle a less than 90 degree in the clockwise direction with respect to the width direction of the recorded traces and the rotary magnetic head having the magnetic gaps set to a predetermined azimuth angle α less than 90 degree in the counterclockwise direction with respect to the width direction of the recorded traces are both rotated at a predetermined number of rotations.

Therefore, after recorded traces are formed on magnetic tape moving in the forward direction at a predetermined travel speed in accordance with the rotational locus of the rotary magnetic heads moving and obliquely crossing the travel direction of the magnetic tape, the recorded magnetic tape is moved in the forward or reverse direction at a travel speed higher than that in the recording operation.

Here, in the case (FF) where the rotational locus surface of the rotary magnetic heads changes in the reproduction operation within a angular range less than 180 degrees in the clockwise direction with respect to the direction of the recorded traces Tr formed on the recorded magnetic tape, control data included in the output signals obtained by the rotary magnetic head Hp having the magnetic gap Mg(p) set to a predetermined azimuth angle α less than 90 degrees in the clockwise direction with respect to the width direction of the recorded traces Tr are selected by a reproduced signal processing section, and the selected control data are supplied to a control section.

On the other hand, in the case (FR) where the rotational locus surface of the rotary magnetic heads in the reproduction operation changes within a angular range less than 180 degrees in the counterclockwise direction with respect to the direction of the recorded traces Tr formed on the recorded magnetic tape, control data included in output signals obtained by the rotary magnetic head Hm having the magnetic gap Mg(m) set to a predetermined azimuth angle α less than 90 degrees in the counterclockwise direction with respect to the width direction of the recorded traces Tr are selected by the reproduced signal processing section, and the selected control data are supplied to the control section.

Therefore, it is possible to operate the magnetic recording and reproducing apparatus under excellent conditions; that is, it is possible to reproduce video signals under excellent condition even when the magnetic tape is moved in the forward or reverse direction at a speed higher than in the recording operation.

What is claimed is:

1. A magnetic recording and reproducing apparatus, comprising:

a rotary magnetic head mechanism having at least a first rotary magnetic head with a magnetic gap set to a predetermined azimuth angle less than 90 degrees in a clockwise direction with respect to a width direction of recorded traces and a second rotary magnetic head with a magnetic gap set to a predetermined azimuth angle less than 90 degrees in a counterclockwise direction with respect to the width direction of the recorded traces;

recording means for forming the recorded traces on a magnetic tape moving in a forward direction at a predetermined travel speed in accordance with a rotational locus of the rotary magnetic heads moving and obliquely crossing a travel direction of the magnetic tape;

selecting means for selecting first output signals obtained by the first rotary magnetic head in the case where a rotational locus surface of the rotary magnetic heads changes in a reproduction operation within an angular range less than 180 degrees in a clockwise direction with respect to the recorded traces formed on the recorded magnetic tape, on the other hand, the selecting means selecting second output signals obtained by the second rotary magnetic head in the case where the rotational locus surface of the rotary magnetic heads changes in the reproduction operation within an angular range less than 180 degrees in a counterclockwise direction with respect to the direction of the recorded traces formed on the recorded magnetic tape; and reproducing means, responsive to the selected first or second output signals, for executing the reproduction operation while the recorded magnetic tape is being moved in the forward direction or a reverse direction at a travel speed higher than a travel speed in a recording operation by the recording means.

2. The apparatus of claim 1 further comprising a drum mechanism of an upper drum and a lower drum, the magnetic tape being wound around a part of a circumferential surface of the drum mechanism, wherein the first rotary magnetic head and the second rotary magnetic head are both arranged at two 180-degree symmetrical positions of the upper drum.

3. The apparatus of claim 1 further comprising:

a third rotary magnetic head, having a magnetic gap set to a predetermined azimuth angle less than 90 degrees in the counterclockwise direction with respect to the width direction of recorded traces, provided in the vicinity of the first rotary magnetic head; and a fourth rotary magnetic head, having a magnetic gap set to a predetermined azimuth angle less than 90 degrees in the clockwise direction with respect to the width direction of the recorded traces, provided in the vicinity of the second rotary magnetic head.

4. A magnetic recording and reproducing apparatus comprising:

a rotary magnetic head mechanism having at least a first rotary magnetic head with a magnetic gap set to a predetermined azimuth angle less than 90 degrees in a clockwise direction with respect to a width direction of recorded traces and a second rotary magnetic head with a magnetic gap set to a predetermined azimuth angle less than 90 degrees in a counterclockwise direction with respect to the width direction of the recorded traces;

recording means for recording data including first and second control data, the recorded traces being formed on a magnetic tape moving in a forward direction at a predetermined travel speed in accordance with a rotational locus of the rotary magnetic heads moving and obliquely crossing a travel direction of the magnetic tape;

selecting means for selecting the first control data included in first output signals obtained by the first rotary magnetic head in the case where a rotational locus surface of the rotary magnetic heads changes in a reproduction operation within an angular range less than 180 degrees in a clockwise direction with respect to the recorded traces formed on the recorded magnetic tape, on the other hand, the selecting means selecting the second control data included in second output signals obtained by the second rotary magnetic head in the case where the rotary locus surface of the rotary magnetic heads changes in the reproduction operation within an angular range less than 180 degrees in a counterclockwise direction with respect to the direction of the recorded traces formed on the recorded magnetic tape; and reproducing means, responsive to the selected first or second control data, for executing the reproduction operation while the recorded magnetic tape is being moved in the forward direction or a reverse direction at a travel speed higher than a travel speed in a recording operation by the recording means.

5. The apparatus of claim 4, wherein the selecting means comprises:

means for generating a drum rotation reference signal on the basis of the data to be recorded;

means, responsive to the drum rotation reference signal, for controlling the rotary magnetic head mechanism to rotate at a predetermined number of rotation;

means, responsive to the rotation of the controlled rotary magnetic head mechanism, for detecting the first and second output signals; and means, responsive to the drum rotation reference signal, for selecting the first control data when the magnetic tape is moved in the forward direction, on the other hand, for selecting the second control data when the magnetic tape is moved in the reverse direction.

* * * * *